CALCULATING MEMORY

Filed Dec. 30, 1960 26 Sheets-Sheet 1

INVENTORS
HAROLD FLEISHER
ROBERT I. ROTH
BY Curtis Ailes Jr.
ATTORNEY

July 21, 1964 H. FLEISHER ET AL 3,141,964

CALCULATING MEMORY

Filed Dec. 30, 1960 26 Sheets-Sheet 3

July 21, 1964 H. FLEISHER ETAL 3,141,964

CALCULATING MEMORY

Filed Dec. 30, 1960 26 Sheets-Sheet 11

July 21, 1964 H. FLEISHER ETAL 3,141,964

CALCULATING MEMORY

Filed Dec. 30, 1960 26 Sheets-Sheet 12

July 21, 1964 H. FLEISHER ETAL 3,141,964

CALCULATING MEMORY

Filed Dec. 30, 1960 26 Sheets-Sheet 13

July 21, 1964 H. FLEISHER ET AL 3,141,964

CALCULATING MEMORY

Filed Dec. 30, 1960 26 Sheets-Sheet 16

July 21, 1964 H. FLEISHER ET AL 3,141,964

CALCULATING MEMORY

Filed Dec. 30, 1960 26 Sheets-Sheet 22

July 21, 1964 H. FLEISHER ET AL 3,141,964

CALCULATING MEMORY

Filed Dec. 30, 1960 26 Sheets-Sheet 26

United States Patent Office 3,141,964
Patented July 21, 1964

3,141,964
CALCULATING MEMORY

Harold Fleisher, Poughkeepsie, and Robert I. Roth, Briarcliff Manor, N.Y., assignors to International Business Machines Corporation, New York, N.Y., a corporation of New York Filed Dec. 30, 1960, Ser. No. 79,823
14 Claims. (Cl. 235—164)

This invention relates to a calculating or computing apparatus having a multi-word internal memory and in which the calculating apparatus is combined in the structure of the memory.

Prior calculating and computing apparatus conventionally has employed internal memory storage of information such as on the surface of magnetic drums or in magnetic cores, and physically separate arithmetic units to which data are transmitted for computation. The result is then returned to storage and the sequence of operations is then repeated for the next computation. In these conventional systems, a tremendous amount of operating time is consumed in fetching data from the internal memory and transmitting it to the arithmetic units, and in carrying the results back to the memory. As the switching speeds of available switching components increase, the time consumed in fetching and carrying the data between the memory and the arithmetic units becomes more and more of a problem in limiting operating speeds.

Furthermore, the number of words which conventional computer arithmetic units are capable of handling simultaneously is generally quite limited, even for operations as simple as the formation of sums. The arithmetic unit capacity is generally limited to two numerical words or multi-digit numbers. Thus, in order to form a sum of a large number of numerical words, it is necessary to fetch each word from memory in a separate step, add that word to the previous sum, and then repeat the operation of "fetch and add" for each word to be included in the sum. This is obviously a lengthy process in terms of the number of machine logical operating steps required as it constitutes a long sequence of repeated operations.

Accordingly, it is an object of the present invention to provide a calculating memory in which the storage and calculating apparatus is essentially combined to avoid the necessity for repeated fetching of words which are to enter into the calculations.

Another object of the present invention is to provide a calculating memory which employs improved structural features and which is directed to the solution of the problems mentioned above.

Another object of the present invention is to provide a calculating memory system which can be embodied to take full advantage of the desirable characteristics of inexpensive four-terminal variable impedance devices such as cryotrons and lamp-photoconductor combinations.

Another object of the present invention is to provide a calculating memory system which is capable of rapid parallel addition of any number of the words stored in memory.

Another object of the present invention is to provide a calculating memory system which is capable of rapid parallel addition of all of a selected group of characters stored in the memory, and in which the selected character group may be limited to selected fields within the words stored in memory and selected words of the total words stored.

Another object of the present invention is to provide a calculating memory system which is capable of rapid parallel operation to accomplish multiplication.

In carrying out the above objects of the invention in one preferred form thereof, a calculating memory system is provided in which numerical digital characters are stored in rows forming data words and having corresponding characters arranged to form columns corresponding to digital orders. A separate adder is provided for each digital order which is connected to receive characters of a selected class read out from that order. Each of the adders is operable to generate sum digits and carry digits representing the sum value of all selected characters of the associated order plus carry digits transmitted from lower orders. And each of the adders also includes connections to transmit carry digits to higher order adders and connections to receive carry digits from lower order adders.

Other objects and advantages of the invention, and a complete understanding thereof will be apparent from the following specification and the accompanying drawings as follows.

Figure 1:
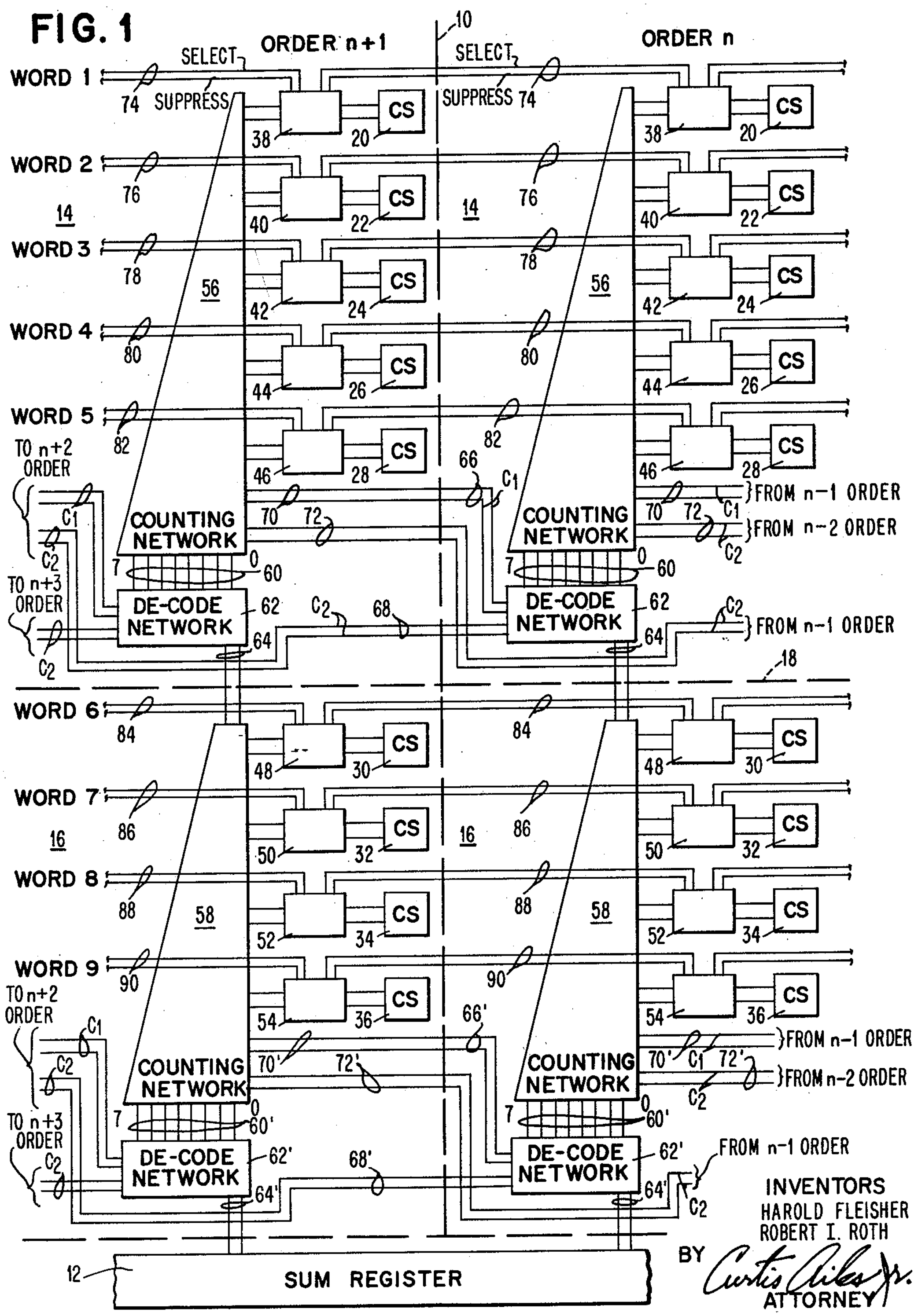
FIGURE 1 is a schematic representation of a preferred form of calculating memory in accordance with the present invention showing an illustrative portion of the memory, that portion being capable of storing two characters of each nine words.

Referring in more detail to FIG. 1, substantially similar column portions of a calculating memory in accordance with the present invention are shown for order $n$ and order $n+1$ respectively to the right and to the left of the center line 10 of the drawing. Both the $n$ and the $n+1$ order columns are connected to provide sum digits to the sum register 12 indicated at the bottom of the figure. Each column includes an upper section indicated as a whole as 14 and a lower section indicated as a whole as 16. Sections 14 and 16 are arbitrarily separated for purposes of description by a horizontal line 18. Each section 14 includes five memory character storage positions 20 through 28, and each section 16 includes four memory character storage cells 30 through 36. For purposes of the description of the system shown in this figure, it is to be assumed that suitable apparatus is provided for reading in and changing information stored in the various character storage cells 20 through 36, although no such apparatus is shown in this figure.

The information contained in these storage cells may be read out as desired, through select-suppress units 38 through 54, to adder networks 56 and 58, through the interconnections shown between the character storage cells 20 through 36 and the select-suppress units 38 through 54, and between the select-suppress units and the counting networks 56 and 58. Counting network 56 of section 14 is capable of counting the values of the five characters from storage cells 20 through 28, and of indicating that count at the connections 60 at the bottom of network 56. In this embodiment of the invention it is generally contemplated that the characters stored are binary digital characters having a value of either zero or one and the counting network is operable to provide a count indication which is expressed in terms of a unique signal on one of the output connections 60 having an assigned value corresponding to the count. This count signal is supplied to a decode network 62 which is capable of changing the count at connections 60 into three binary output signals including a binary sum bit at connections 64, a first order carry bit $C_1$ at connections 66, and a second order carry bit $C_2$ at connections 68. The counting network 56 also includes binary input connections for receiving first and second order carries $C_1$ and $C_2$ from prior orders as indicated at 70 and 72. The lower portions of counting network 58 are similar to the corresponding portions of network 56 and the associated apparatus and connections are similar. Accordingly, these connections and components are similarly numbered 60' through 72'.

It is to be seen that the first order carry $C_1$ from the order $n$ decode network 62 as indicated on connections 66, becomes the first order carry input at connections 70 for the counting network 56 of the order $n+1$. The second order carry $C_2$ output connections 68 from order $n$ are connected to the $C_2$ input connections corresponding to the counting network input connections 72 for order $n+2$ (not shown). Thus it is to be seen that a first order carry $C_1$ is delivered to the next higher order and summed in a counting network 56 or 58, and a second order carry $C_2$ is fed to the second higher order and summed in counting network 56 or 58. It will be appreciated that when operating with binary notation, with each column section 14 or 16 being capable of generating a sum bit plus a first order carry $C_1$ and a second order carry $C_2$, the section is capable of counting binary bits having a total maximum value corresponding to decimal seven. Accordingly, section 14 has provision for seven inputs to the counting network 56, including five storage positions 20 through 28 and two carry inputs 70 and 72. The section 16 counting network 58 also has seven inputs except that one input is provided in the form of the previous count at connections 64 of the decode network 62 so that only four memory bit storage cells 30 through 36 can be accommodated.

The word capacity of the memory can be expanded to any desired size by inserting, in every column, additional column sections 16 between section 14 and sum bit register 12. Each additional section 16 will provide facilities for four additional word characters in that order column. Similarly, the word size can be increased as desired by providing additional columns in the memory. It will be apparent that column sections corresponding to 14 and 16 having adding capacities different from decimal 7 may be employed without departing from the spirit of this invention. For instance, a total adding capacity of fifteen could be provided by the addition of the capability to carry to the third order with a $C_3$ output. A typical word bit capacity served by an intermediate section corresponding to section 16 in such a system would then be eleven bits or characters (fifteen minus three carry inputs, minus one previous sum bit).

The counting networks 56 and 58, considered together with the decode networks 62 and 62', and associated interconnections plus corresponding additional networks 58 and 62' in any additional sections 16 which are provided for a particular order column will be collectively referred to hereinafter as an adding circuit.

It is an important feature of this invention that the select-suppress units 38 through 54 are individually controllable to either select or suppress the characters stored in the associated character storage cells. This selection and suppression control may be carried out for instance on the basis of selection or suppression of entire words by means of continuing select-suppress word control lines indicated at 74 through 90, a signal on the upper line of each pair indicating "select," and a signal on the lower line of each pair indicating "suppress." The select-suppress units 38 through 54 are individually operable when in the suppress mode to transmit a zero value to the associated counting network 56 or 58 regardless of whether a zero or a one is stored in the associated character storage cells 20 through 36. However, if the select-suppress unit is operating in the select mode, the zero or one value stored in the associated character storage cell is transmitted without change, to the associated counting network 56 or 58.

The system as described in FIGURE 1 is a particularly well-adapted for mechanization with simple and inexpensive four terminal variable impedance devices such as cryotrons or lamp-photoconductor combinations. Detailed embodiments will next be described employing cryotrons, and a lamp-photoconductor embodiment will later be indicated and described in connection with FIGURE 13.

The term "cryotron" as used in the description of certain embodiments of the present invention refers to cryogenic gating devices composed of materials which are said to be normally superconductive when maintained at very low temperatures such as may be achieved by immersion in liquid helium, for example. These cryotron gating devices include a main or gate conductor of superconductive material and a separate control conductor arranged such that when a current is provided in the control conductor, it is effective to produce a magnetic field which causes the gate conductor to lose at least some of its superconductive properties so that the gate conductor becomes resistive.

Figure 2:
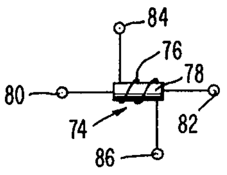
FIGURE 2 illustrates in schematic form a cryotron, four-terminal device which is useful in the construction of physical embodiments of the present invention.

FIGURE 2 illustrates such a cryotron device 74 having a control winding 76 around a gate element 78. The current to be gated or controlled flows through the gate element 78 between terminals 80 and 82, while the control current which causes such gating flows through the winding 76 between terminals 84 and 86.

Figure 3:
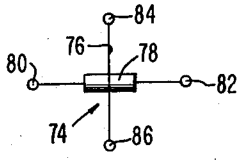
FIGURE 3 is a simplified representation of the cryotron of FIGURE 2 which is employed in subsequent figures showing cryogenic system embodiments of the present invention.

In FIGURE 3, the cryotron of FIGURE 2 is illustrated in a simplified form, the same reference numerals being employed to designate corresponding parts. It is to be seen that the only difference is that the winding 76 is represented in FIGURE 3 simply by a conductor disposed across gate element 78. This simplified representation of a cryotron is employed in all of the remaining figures showing cryogenic embodiments of the present invention. In these systems, the circuit lines or wires and the control conductor or winding 76 of each cryotron may be composed of a so-called "hard" superconductor material such as niobium or lead. On the other hand, the gate element 78 of each cryotron is composed of a "soft" superconductor material such as tantalum or tin, for instance. The current employed is such that the current in the control winding 76 creates a magnetic field which exceeds the critical field value to cause the gate to become resistive, but the field does not exceed such a critical value with respect to the material of the control winding 76 and the interconnecting lines and wires, so that these elements remain substantially superconductive.

When two gate conductors are electrically connected in parallel, one being superconducting and the other being resistive, a current flowing to the parallel combination will flow entirely through the superconducting gate, although the other gate may exhibit only a few tenths of an ohm resistance. Then, if the resistive gate is allowed to become superconducting, the current will continue to flow through the original superconducting gate. Thus, current is caused to flow through a selected path which is maintained superconducting and such current will continue to flow in that path even though other parallel paths later become superconducting.

It is to be understood that the cryotron devices may be constructed of thin films such as are shown and described in co-pending application Serial Number 625,512, filed November 30, 1956, by R. L. Garwin an entitled "Fast Cryotrons" and assigned to the same assignee as the present invention. Additional information on cryogenic superconductive gating devices and certain logical circuits which may be created with such devices is contained in an article by D. A. Buck entitled "The Cryotron—A Superconductive Computer Component," in Proceedings of the IRE, volume 44, No. 4, pages 482–493, April 1956.

Figure 4:
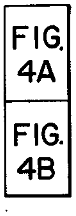
FIGURE 4 is a diagram incorporating FIGS. 4A and 4B and showing the manner of interconnection of those figures to form a schematic diagram of a cryogenic embodiment of the system illustrated in FIG. 1.
Figure 4A:
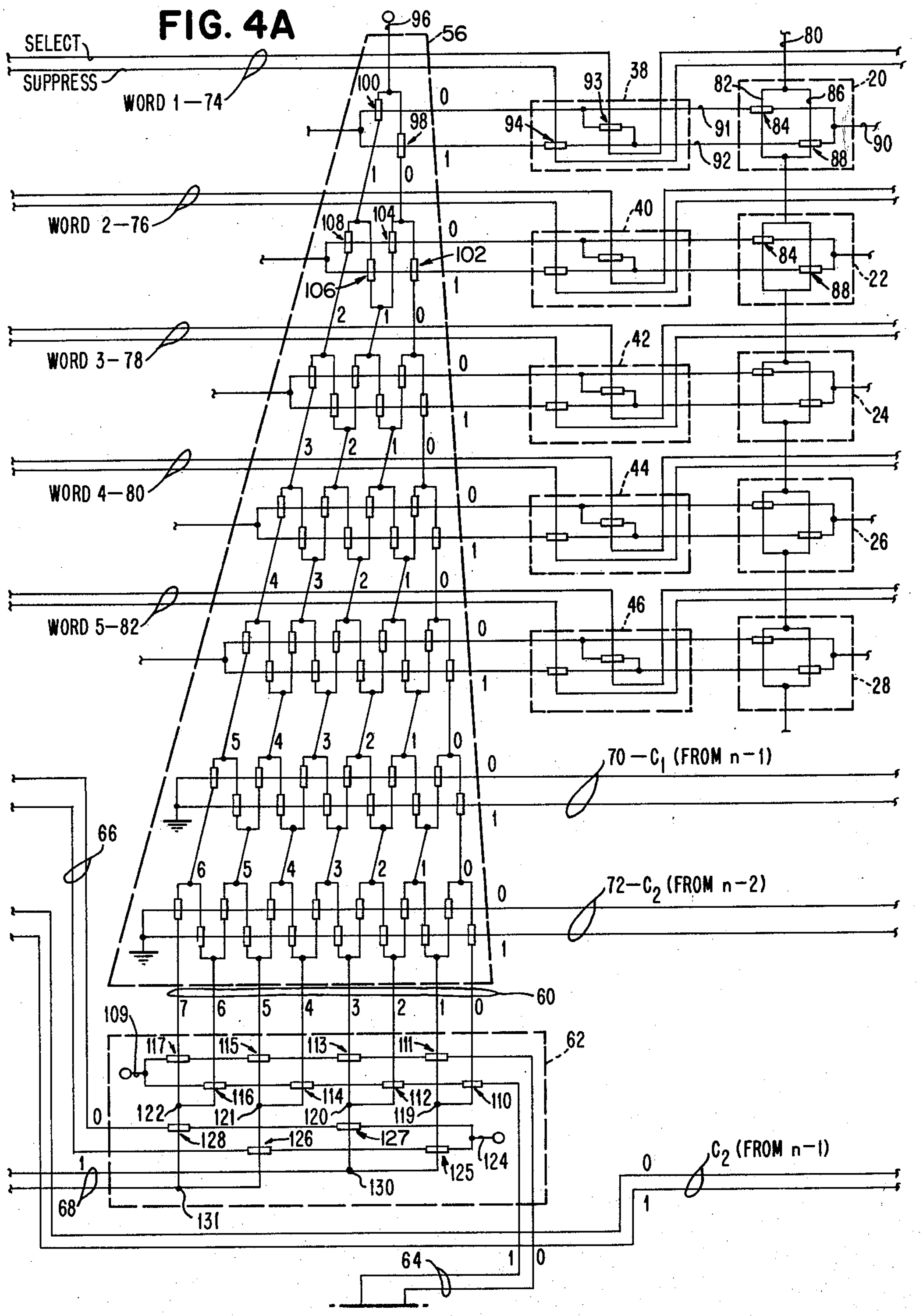
Figure 4B:
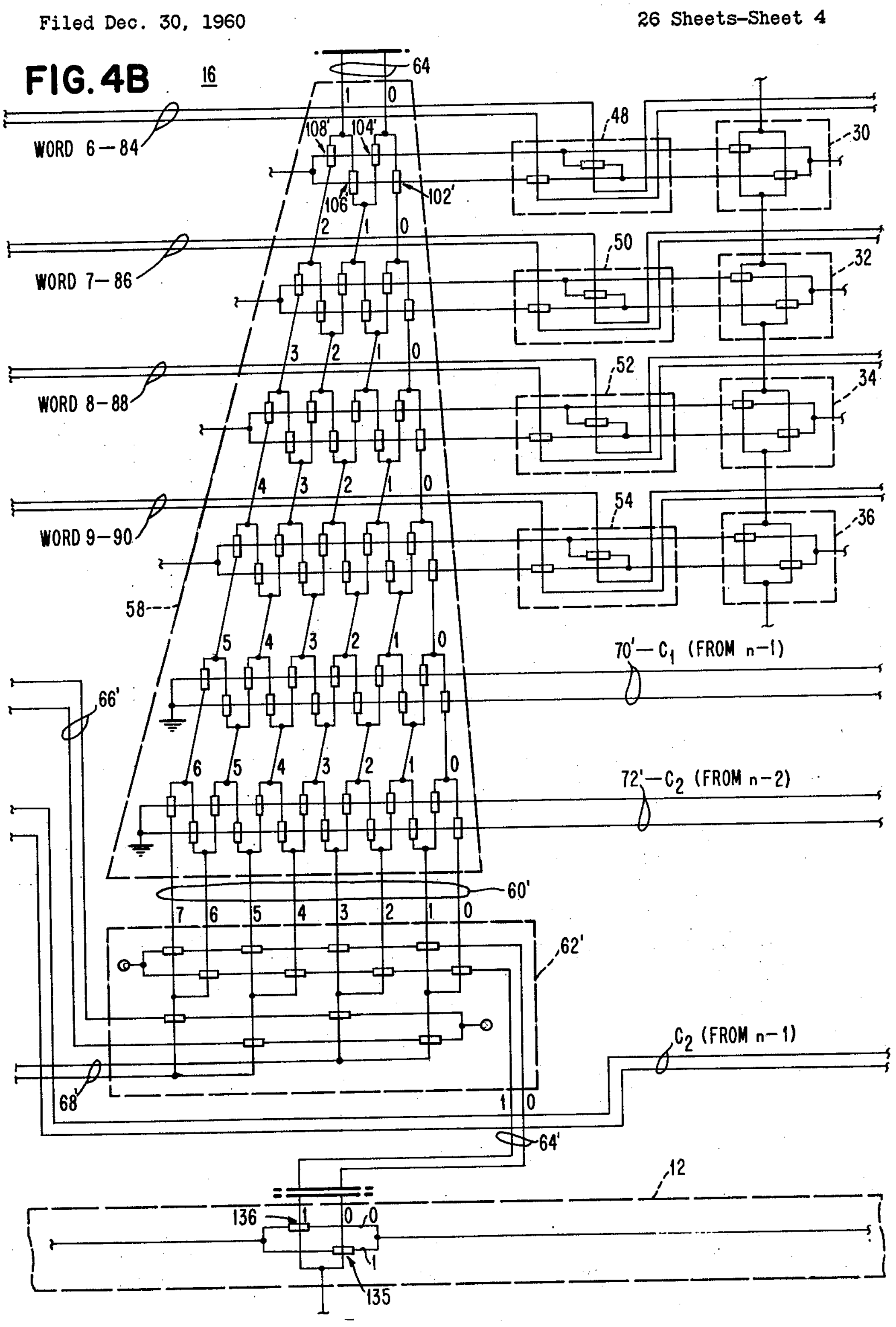

FIGURE 4 incorporates FIGURES 4A and 4B and shows the manner of interconnection of FIGURES 4A and 4B to form a schematic diagram of a cryogenic embodiment of a single order of a system such as has been previously described in connection with FIGURE 1. FIGURES 4A and 4B may be collectively referred to below as FIGURE 4.

FIGURE 4 may be taken as representing the column for the order *n*, with FIGURE 4A representing column section 14 of FIGURE 1 for the *n*th column, and FIGURE 4B showing section 16 of the *n*th column, plus the related portion of the sum register 12. All of the components indicated in FIGURE 1 by closed boxes, such as the character storage units 20 through 36, the select-suppress units 38 through 54, and the counting and decode networks 56 and 62, are similarly enclosed in identically lettered boxes in FIGURE 4. However, in FIGURE 4 the boxed enclosures are dotted to contrast with the internal circuit connections. The connections between boxes in FIGURE 4 are identical to those shown in FIGURE 1 and the explanations for the mode of operation of the system for FIGURE 1 applies also to FIGURE 4.

The following is a more detailed explanation of the cryogenic embodiment of FIGURE 4 (FIGURES 4A and 4B), including an explanation of the operation of the circuits within the boxes. The character storage cells 20 through 36 are each provided with vertical current flow information storage branch circuits supplied with a current entering cell 20 as indicated at 80. The current from connection 80 traverses either the branch circuit 82 within cell 20, including the control winding of cryotron 84, or the branch 86, including the control winding of cryotron 88. Current in branch 82 indicates a binary one and current in branch 86 indicates a binary zero. Other switching means, not shown, are employed for the purpose of setting up these currents in either the one branch 82 or the zero branch 86 of each of the various storage cells 20 through 36. For purposes of simplifying FIGURE 4, these other switching devices are not shown, but suitable storage input switching circuits (writing circuits) will be described later in connection with FIGURE 7.

To promote the clarity and ease of understanding of the cryogenic embodiments of the invention shown herein, the custom is followed throughout the drawings of showing alternate circuit paths indicating or storing binary zero or binary one with the "zero" line art the right or the top and with the "one" line at the left or the bottom.

Horizontal current paths are provided for reading out the information stored in each character storage cell. Such currents are supplied for instance, as at connection 90 which passes either through the gate of cryotron 84 on line 91 to indicate the read out of a zero, or through the gate of cryotron 88 on line 92 to indicate a one value. The information read-out current signals thus pass from the character storage cells to each of the associated select-suppress units 38 through 54. Each select-suppress unit, such as 38, includes a cross over cryotron 93 which may be referred to as a "select" cryotron, and a "suppress" cryotron 94. Of the select-suppress control lines 74 for the word one, the upper control line is the word select line and the lower line is the word suppress line and current is supplied alternatively either line depending upon whether word one is to be selected or suppressed. It is to be seen that the suppress line of pair 74 traverses the control winding of suppress cryotron 94 in the select-suppress unit 38. This causes any "one" information current issuing from the gate of cryotron 88 on line 92 to be sent through the cross over cryotron 93 to join the zero line 91. Thus, no matter whether a "one" or a "zero" is stored in the character storage cell 20, a zero is emitted from the select-suppress unit 38 if the suppress line of the pair 74 is energized. Thus, only a zero is transmitted to the counting network from select-suppress unit 38 if the suppress line of pair 74 is energized. Alternatively, if the select line of pair 74 is energized, the current traverses the control winding of cross over cryotron 93 so as to prevent the cross over of any "one" current in line 92 to the "zero" line 91; and to cause the select-suppress unit 38 to transmit any "one" bit received from the storage cell 20 to the counting network 56 without change.

In the counting network 56, zero or one bit signal currents enter at each word level, and a current entering at the top as indicated at 96, is switched in the counting network 56 to count one bits. Thus, a pair of cryotrons 98 and 100 are provided at the first work level, having their gates arranged to alternatively receive the current from connection 96, and having their control windings traversed by the information currents transmitted from the select-suppress unit 38. A "zero" information current received on the control winding of cryotron 100 forces the current from 96 to traverse the gate of cryotron 98 to indicate a zero sum from this first level. Conversely, a "one" information current proceeding from the gate of cryotron 94 through the control winding of counting network cryotron 98 closes the gate of 98 and forces the current from 96 through the gate of cryotron 100 on the "one" count branch. At the second word level of adder 56, two pairs of cryotrons 102 through 108 are provided. In a manner of operation similar to that described above, a zero count at the first word level issuing as a current through the gate of cryotron 98 will be raised from "zero" to "one," if a "one" signal current appears at the control winding of cryotron 102 to force that current through the gate of cryotron 104, while a "zero" signal at the control winding of cryotron 104 will force the current through the gate of cryotron 102 to again indicate a "zero" count directly beneath the second word section of network 56. In a similar manner, if a "one" bit was counted at the word one level, a one bit can also be counted at the word two level by a current from select-suppress unit 40 which traverses the control winding of cryotron 106 to force current through the gate of cryotron 108. Conversely, a zero bit at the word two level will provide current through the control winding of cryotron 108 and force the current through the gate of cryotron 106 to maintain the count at the one level. It will be understood from the remainder of the diagram of the network that for each added word position of the network, the network is widened by one pair of cryotrons for the purpose of providing the possibility of achieving a higher count. Similarly, immediately below the word five level, the information lines 70 enter the network to indicate a carry one $C_1$ signal from the $n-1$ order, and at the next level below that, information signals enter on lines 72 for a carry two $C_2$ signal from the $n-2$ order. It is to be seen that at each of these two levels the network also becomes two cryotrons wider, so that at the output connections 60 from the network 56, there is a possibility of the indication of any count from zero through seven as indicated by a current on one of the eight lines 60. The lines are respectively labeled with their values zero through seven. This information at the connections 60 may be said to be conveyed in the form of a "one out of eight" signal, since the information is represented as a unique signal condition on only one out of the eight separate current paths.

The one out of eight information signal on lines 60 is converted in the decode network 62 into a binary form including a sum bit having a zero or one value indicated by an output on one of the pair 64, a first order carry signal $C_1$ on output pair 66 which is indicative of the presence of a two component, and a second order carry signal $C_2$ on output pair 68 indicative of the presence of a four component. The sum bit for output pair 64 is derived from current supplied at a current source connection 109 to the even or odd circuit cryotrons 110 through 117. Thus, if the output from the network at connections 60 is odd, a current will flow through one of the control windings of cryotrons 111, 113, 115, or 117 to force the current of 109 through the gates of cryotrons 110, 112, 114 and 116 to indicate a "one" value for the sum. Conversely, if the output from the network on connections 60 is even, the current will traverse the control windings of one of the cryotrons 110, 112, 114 or 116 to force the current from 109 through the gates of cryotrons 111, 113, 115 and 117 to indicate a zero sum on the output pair 64. Immediately below the cryotrons just mentioned, adjacent pairs of lines are joined to simplify the subsequent portions of the decode network. Thus, the zero and one lines are joined at 119, the two and three lines at 120, the four and five lines at 121, and the six and seven lines at 122. The outputs from these joined pairs thus serve as an indication of a count by two which is needed for the generation of the carry one output $C_1$ on lines 66. For this purpose, a current is supplied at 124 to traverse the branch circuit containing cryotrons 125 and 126 to indicate a one value, or to traverse the branch containing cryotrons 127 and 128 to indicate a zero value for the first order carry $C_1$. Thus, if the count is two or three or six or seven, the current is supplied either from point 120 or point 122 through the control windings either of cryotron 127 or 128 to force the 124 current through the branch including cryotrons 125 and 126 to indicate a "one" value for the first order carry $C_1$. On the other hand, if the count is zero or one or four or five, current is supplied either from point 119 or point 121 through the control winding either of cryotron 125 or 126 to force the current into the other branch including the gate of cryotron 127 to indicate a zero first order carry $C_1$.

The currents from the last-mentioned cryotrons are further joined into pairs as indicated at 130 and 131 and current beyond the point 130 thus indicates a value of zero through three, or a current beyond point 131 indicates a value of four through seven. These are respectively the conditions which call for "zero" second order carry $C_2$ or a "one" value of the second order carry $C_2$, and accordingly the circuits beyond points 130 and 131 may be directly employed as the zero and one signal lines for the $C_2$ output pair 68.

Column section 16 shown in FIGURE 4B is substantially similar to column section 14 shown in FIGURE 4A with the major exception that only four word character storage positions are provided rather than five. This is necessary because the network 58 counts only to a total of seven, and there is an input from the sum pair 64 at the top of network 58. Since the input from pair 64 may have a value of either zero or one, it is necessary to limit the number of new word character bits to be accommodated in this section to four in order to stay within the seven count capacity of the network 58. Accordingly, the sixth word digit bit is read into the network 58 at the "two" count level corresponding to the level of word two in section 14, and the network cryotrons in network 58 corresponding to the two level network cryotrons in 56 are numbered similarly, 102′ through 108′. It is apparent that the operation of the network 58 is analogous to the operation of network 56 just described above. The decode network 62′ is identical in construction and operation to the decode network 62 and accordingly it will not be further described.

As previously explained in connection with FIGURE 1, column section 16 is a typical intermediate column circuit and this column circuit section may be repeated over and over again as many times as is necessary, in vertical alignment, to form a column in the memory which has as much word capacity as is desired. In each instance, the sum bit output pair 64′ will feed into the topmost network input pair 64 of the succeeding section 16 circuit.

Finally, the column sum from the lowermost sum output pair 64′ is stored in a sum register 12 in a sum bit position signified by a storage loop having alternate current branches containing cryotrons 135 and 136. Since the zero sum bit output line connects with the control winding of cryotron 135, the zero storage path is the path including the gate of cryotron 136. The zero output on pair 64′ will cause the sum storage current to traverse the cryotron 136 gate path. Conversely, current on the one sum output line which traverses the control winding of cryotron 136 forces the storage current into the cryotron 135 gate path signifying the storage or a "one." It will be appreciated that other circuits may be provided (not shown) for the purpose of reading out information stored in this sum register. It will be appreciated also that since a fresh current is provided from the decode network 62′ to provide the sum bit output on line 64′, the alternate path loop provided by the pair 64′ is itself a storage loop circuit, as shown.

Having shown and described a typical organization of a system in accordance with the present invention in connection with FIGURE 1, and having shown and described a cryogenic implementation of the system of FIGURE 1 in connection with FIGURE 4, several modifications of the organization of FIGURE 1 will now be described in connection with FIGURES 5 and 6.

Figure 5:
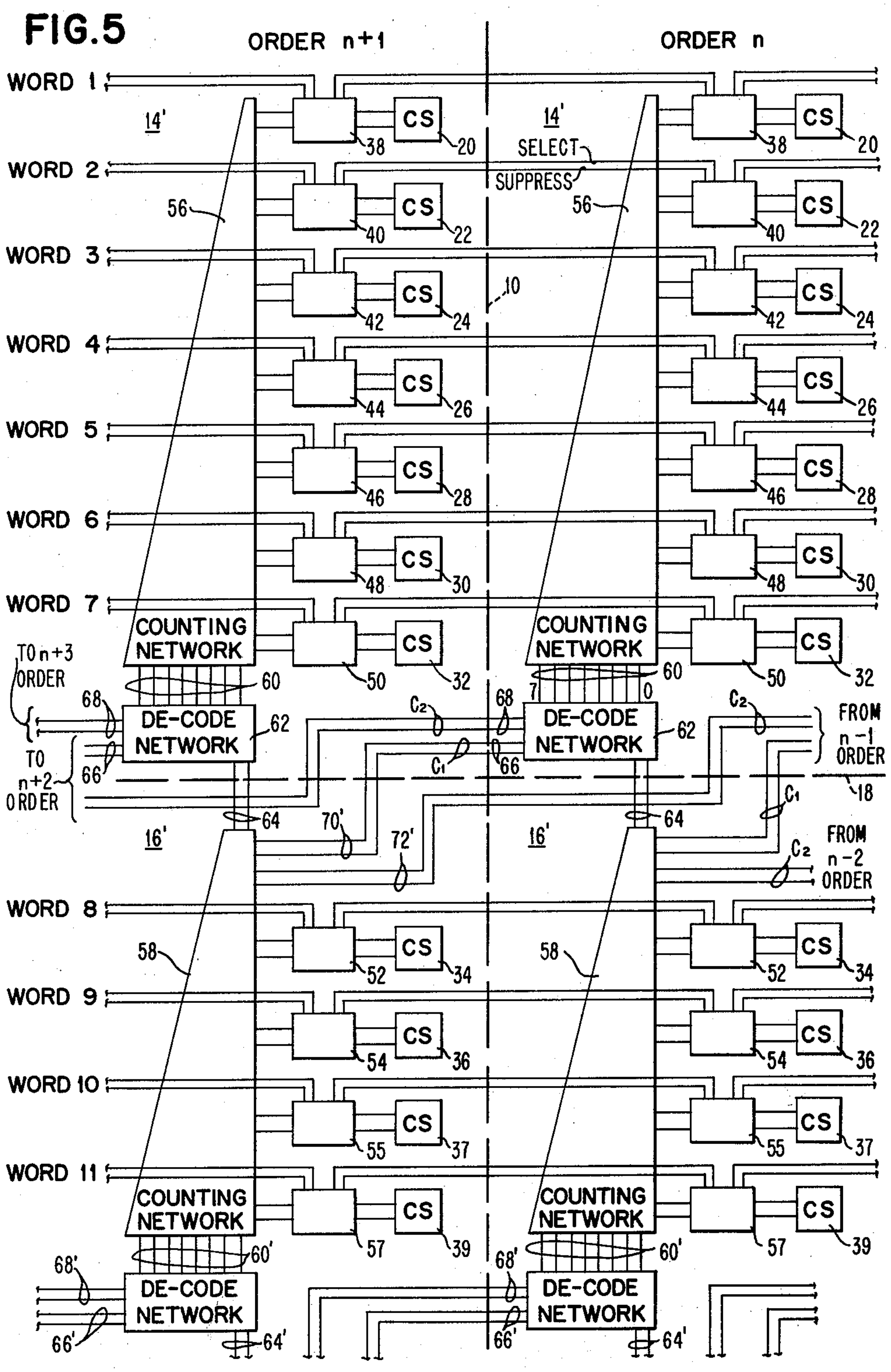
FIGURE 5 is a schematic diagram illustrating a modified form of the invention as previously illustrated in FIG. 1.

In FIGURE 5 there is illustrated a modification of the system of FIGURE 1 in which each of the first and second order carry signals $C_1$ and $C_2$ are transmitted to the higher order column adding circuits in the next lower level of adding circuit sections. To promote an understanding of FIGURE 5 based on the prior explanation of FIGURE 1, identical components are given the same numbers in FIGURE 5 as they were given in FIGURE 1 and corresponding but non-identical components are given the same numbers plus an added prime (′) mark. In FIGURE 1 it was pointed out that in column section 14 for order $n$, the decode network 62 provided $C_1$ and $C_2$ outputs on output connection pairs 66 and 68 which were respectively connected to corresponding adding circuit sections 14 for the order $n+1$ and $n+2$. Thus, in FIG. 1, output pair 66 for the first order carry $C_1$ connects with the input pair 70 of the counting network 56 of the order $n+1$, while the second order carry $C_2$ output on pair 68 from the order $n$ connects with the input pair 72 of the counting network 56 in the $n+2$ order. The chief difference in the modification of FIGURE 5 is in the fact that the $C_1$ and $C_2$ outputs from decorder 62 on pairs 66 and 68 are not connected to a higher order network 56 in the same section level, but instead are connected each to a higher order network 58 in the next lower column section level. Thus, the order $nC_1$ output on pair 66 is connected with the carry input pair 70' of the network 58 of column section 16' for the $n+1$ order. Similarly, the $C_2$ output on pair 68 from order $n$ is connected to the input pair 72, for the network 58 of column section 16' of the $n+2$ order column.

This arrangement, with downward propagation of carries in the system is faster in operation than the system of FIGURE 1. This is true because the carry propagation from a lower order will modify the sum output of any higher order decode network 62. By sending the carries to a lower section level, the speed of downward propagation of sums in the same columns and the downward and leftward propagation of carries is better matched. The principle of carry propagation connections of FIGURE 5 will apply in the propagation of carries from the lower sections 16' and duplications thereof.

In the modification of FIGURE 5, the first section 14' in each order column can accommodate the word characters for the sixth and seventh words, in addition to words one through five because of the fact that no carries need be accommodated in the first section counting network 56. Accordingly, character storage cells 30 and 32 and associated select-suppress units 48 and 50 have been moved up to section 14', and two additional word position storage levels for words ten and eleven are added to replace them in the section 16'. These are indicated by the added character storage positions 37 and 39 with corresponding select-suppress units 55 and 57. It will be understood however, that in the final column section at the bottom of each column, the last counting network 58 will be able to accommodate only two new words, as four carry signals from lower orders will generally have to be accommodated. These include two carries from the next higher level sections plus two carries from the column sections at the same level for lower order columns. In all other respects, the modification of FIGURE 5 is quite similar to the embodiment of FIGURE 1.

Figure 6:
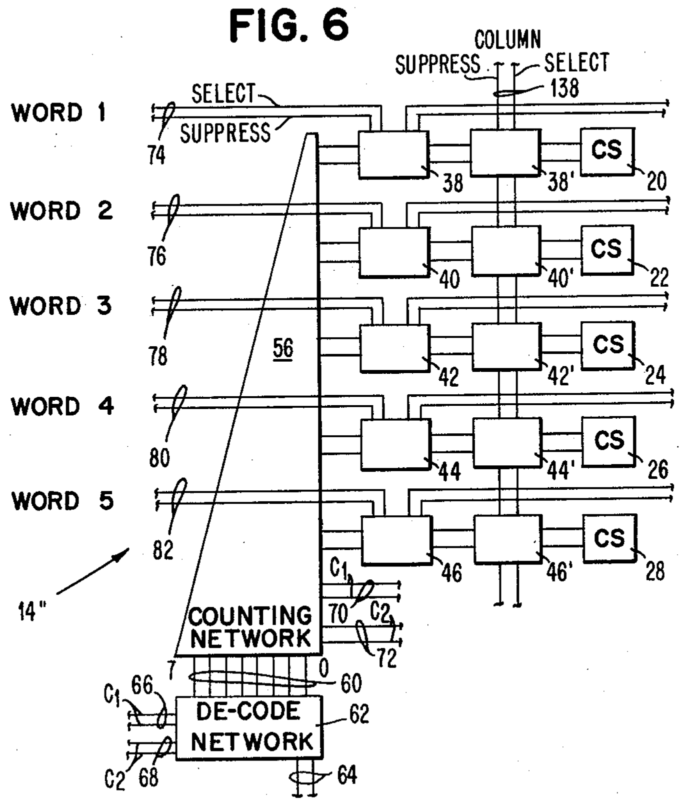
FIG. 6 is a schematic representation of a portion of an embodiment of the invention similar to FIG. 1, with an added feature relating to the selection or suppression of columns of the memory.

FIGURE 6 illustrates another modification of the system of FIGURE 1 in which a select-suppress feature by columns is added. FIGURE 6 shows a single column section 14'' corresponding to column section 14 of FIGURE 1. This modification is similar in every respect to section 14 of the system of FIGURE 1 except that an additional select-suppress unit has been inserted between each character storage cell 20 through 28, and the existing select-suppress units 38 through 46. These additional select-suppress units are identified as 38' through 46'. Each of these additional select-suppress units may be substantially identical in construction to the select-suppress units 38 through 46 and may be embodied in cryogenic circuitry as shown and described in connection with unit 38 in FIGURE 4A. As previously described in connection with the select-suppress units 38 through 46, each of the units 38' through 46' is operative when in the "suppress" mode to force any character from the associated character storage cell to appear as a zero when transmitted through the select-suppress unit. The entire set of select-suppress units 38' through 46' is under the control of a pair of column select-suppress lines 138, a current signal always being supplied through one of the lines of this pair to either select or suppress any read out of one bit characters from any of the positions of the column with which the pair of controls is associated.

Therefore, in the modification of FIGURE 6, words may be selected or suppressed as before through the operation of the select suppress units 38 through 46 previously described, or columns may be suppressed through the operation of select suppress units 38' through 46', either suppress control being capable of suppressing the read out of a "one" from an associated character storage cell, and both select controls being necessarily energized in order to permit the read out of any "one" from an associated character storage cell. It will be appreciated that the column select-suppress circuit may be very useful in permitting the operation of the system for the purpose of reading out or adding only selected portions of numerical words stored in memory. The utility of this system is illustrated for instance in the case where a word consists of several "fields" which contain different pieces of information which it is desired to read out for summing in separate operations. For instance, each word might contain separate fields representing a serial number and a pay rate for an individual employee in payroll records. If a summation of the total payroll is desired, all of the employee serial number fields must be suppressed by operation of the column select-suppress circuits for the columns representing the employee serial numbers. It will be apparent, of course, that the column select feature of FIGURE 6 may be incorporated in a similar system which does not have word select.

Figure 7:
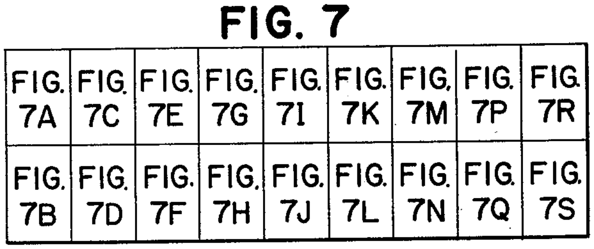
FIG. 7 is a diagram incorporating FIGS. 7A through 7S showing the manner of interconnection of those figures to form a schematic diagram of a detailed cryogenic embodiment of the system of FIG. 1 with added features relating to read-in apparatus.
Figure 7A:
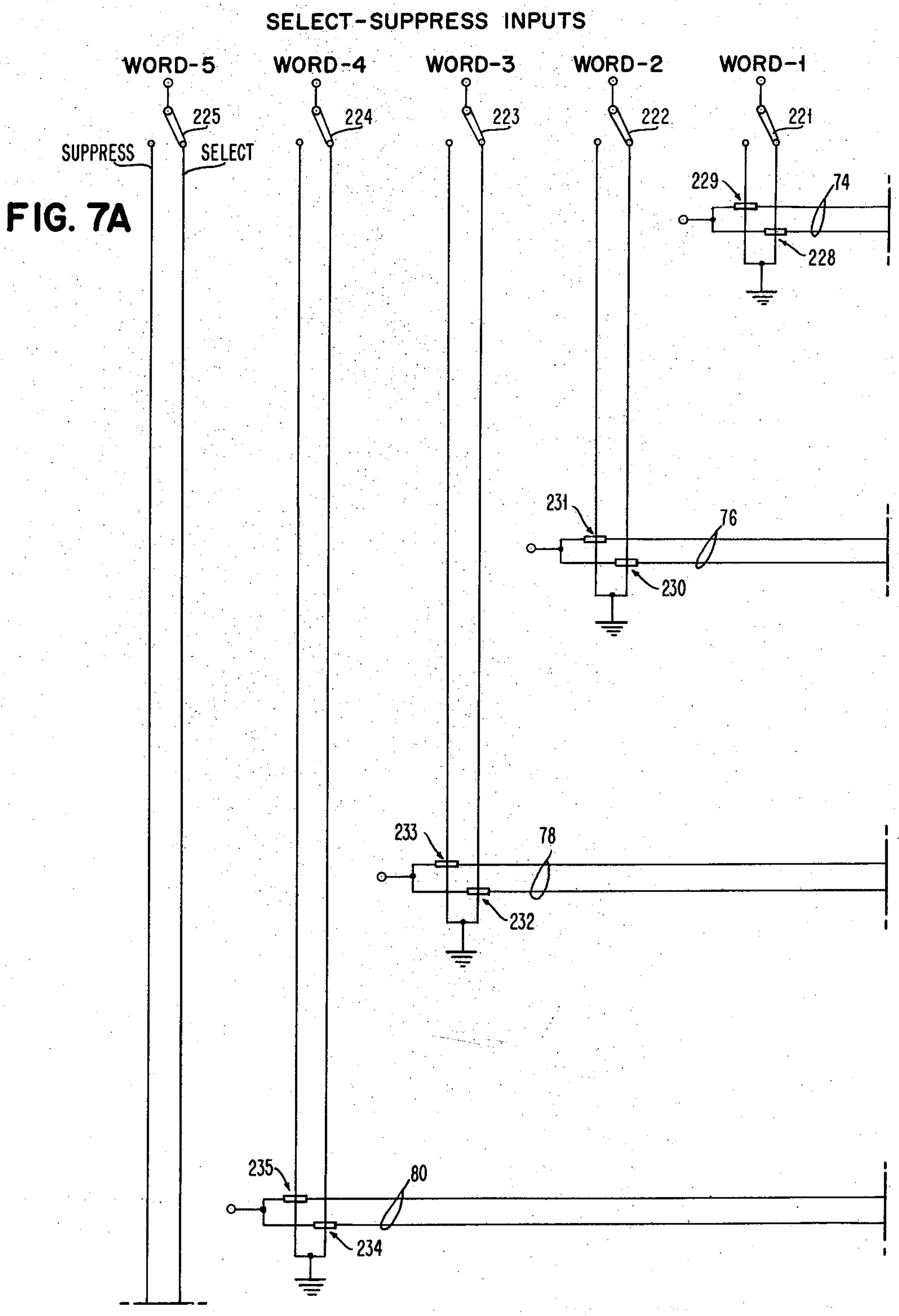
Figure 7B:
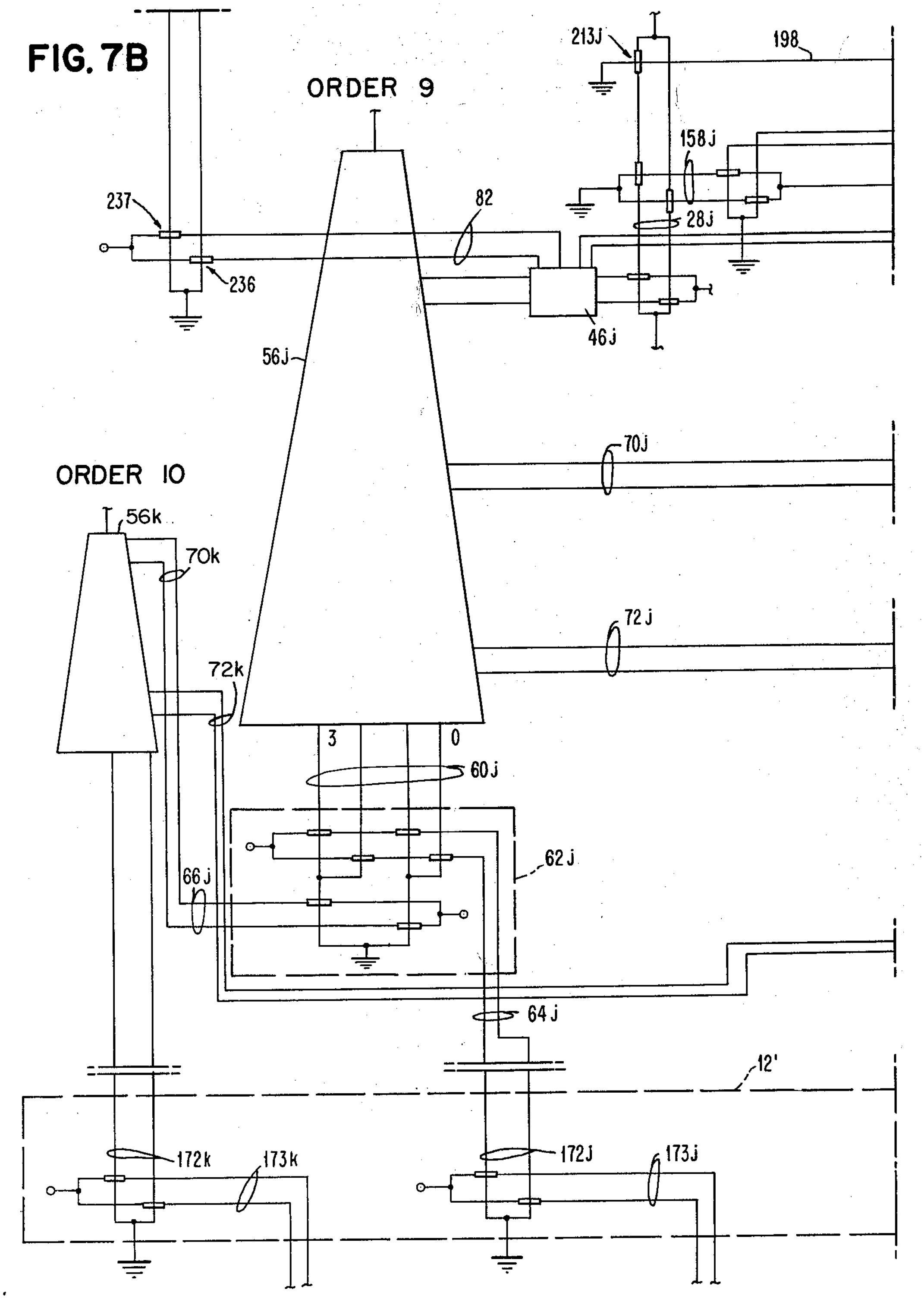
Figure 7C:
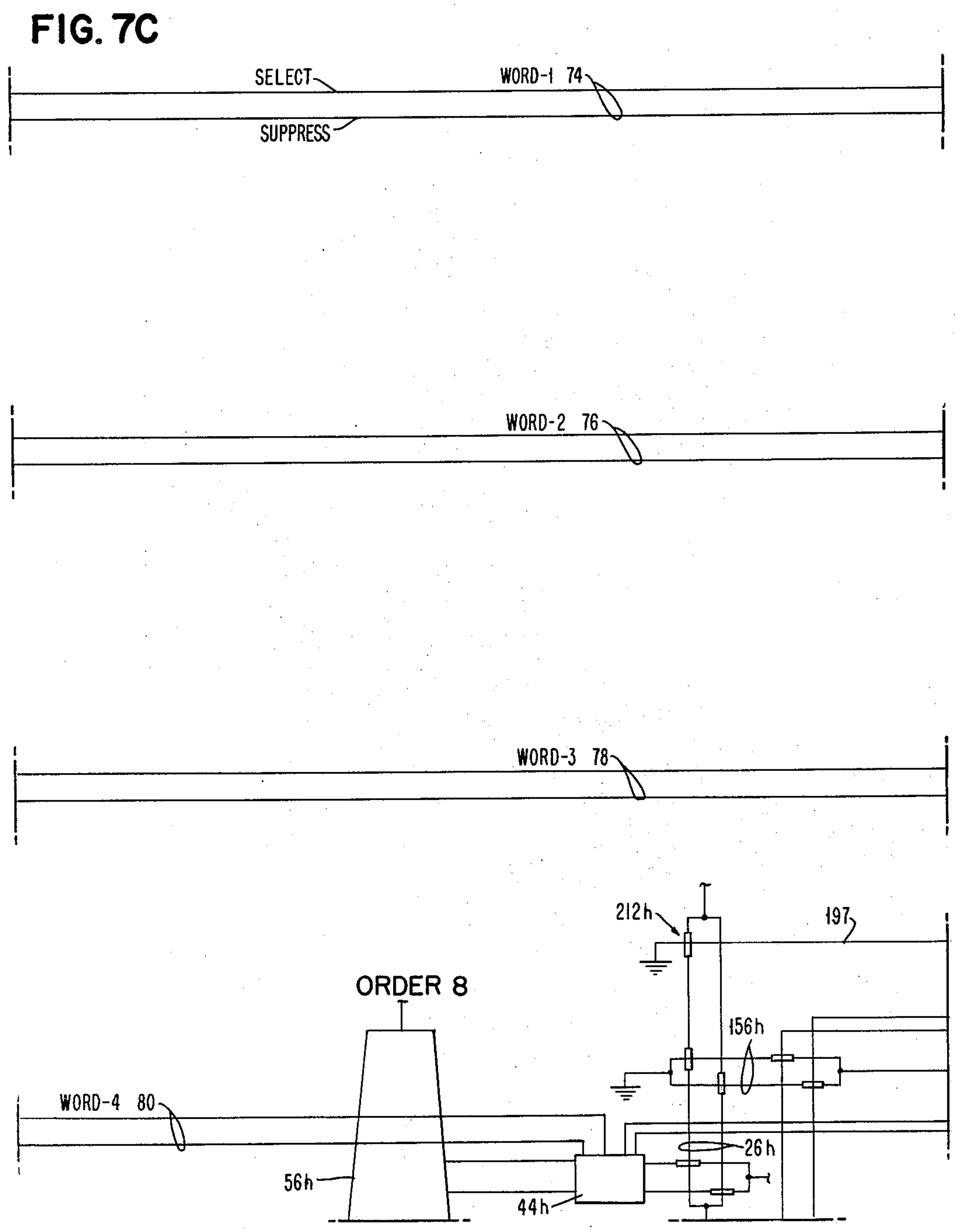
Figure 7D:
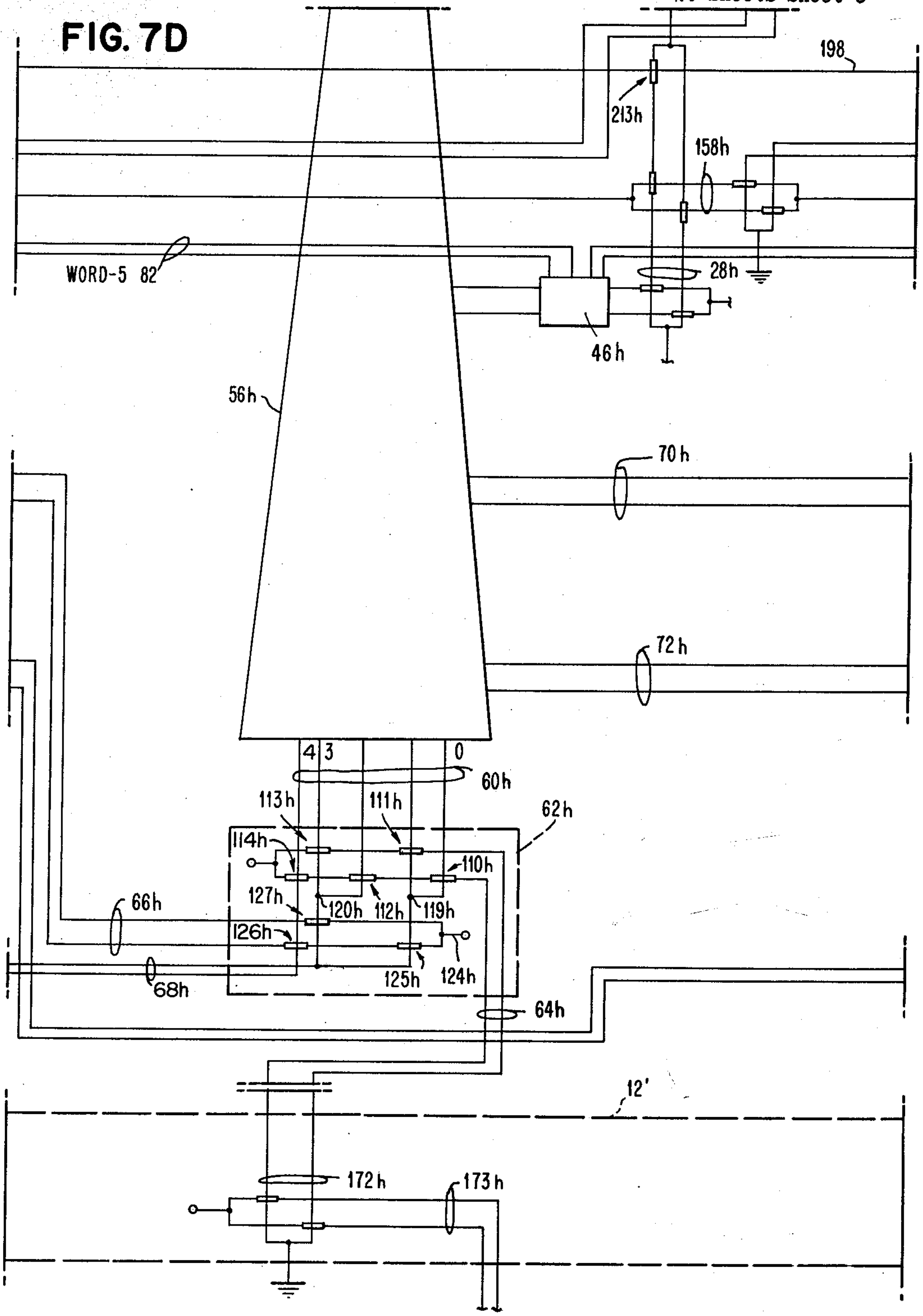
Figure 7E:
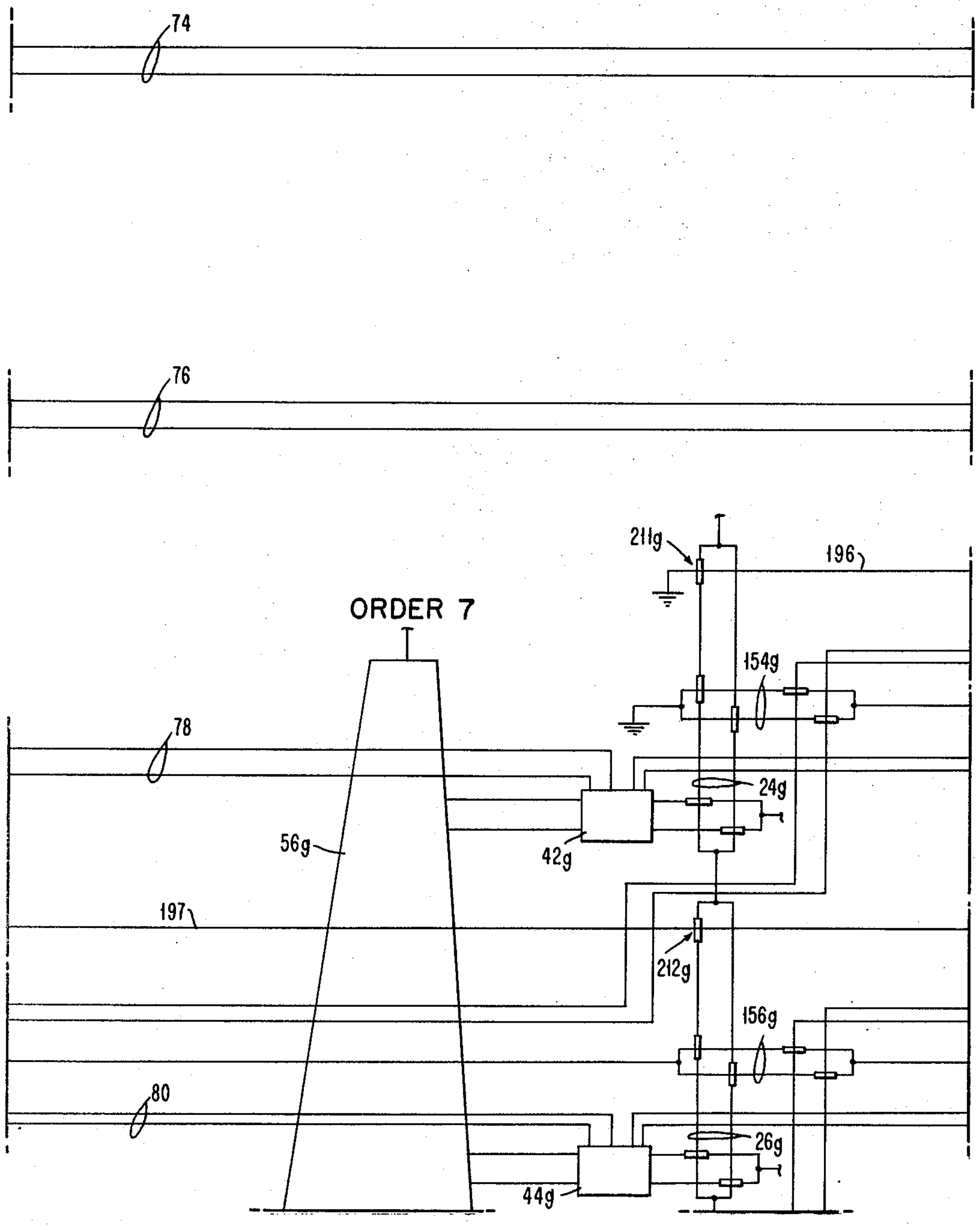
Figure 7F:
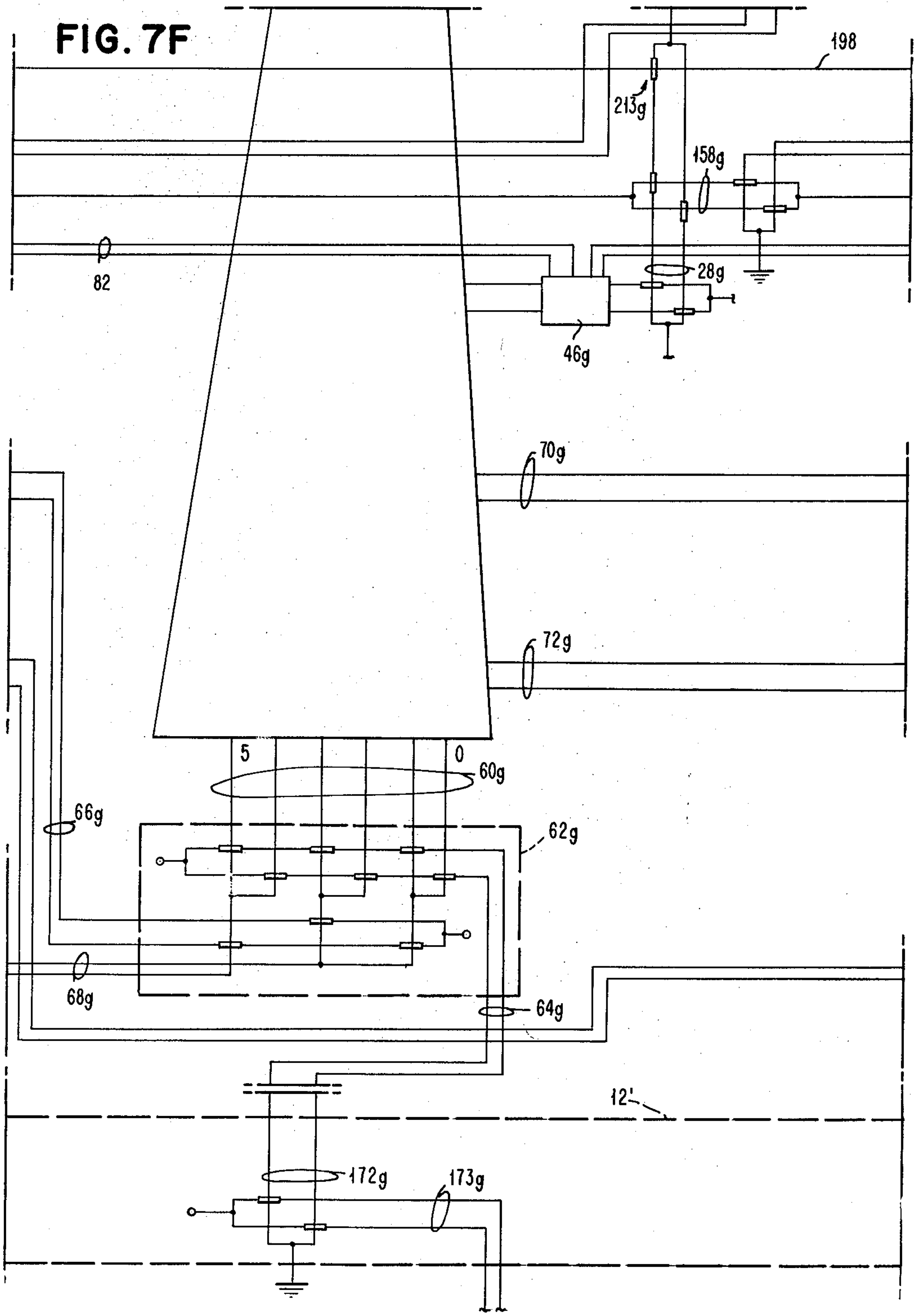
Figure 7G:
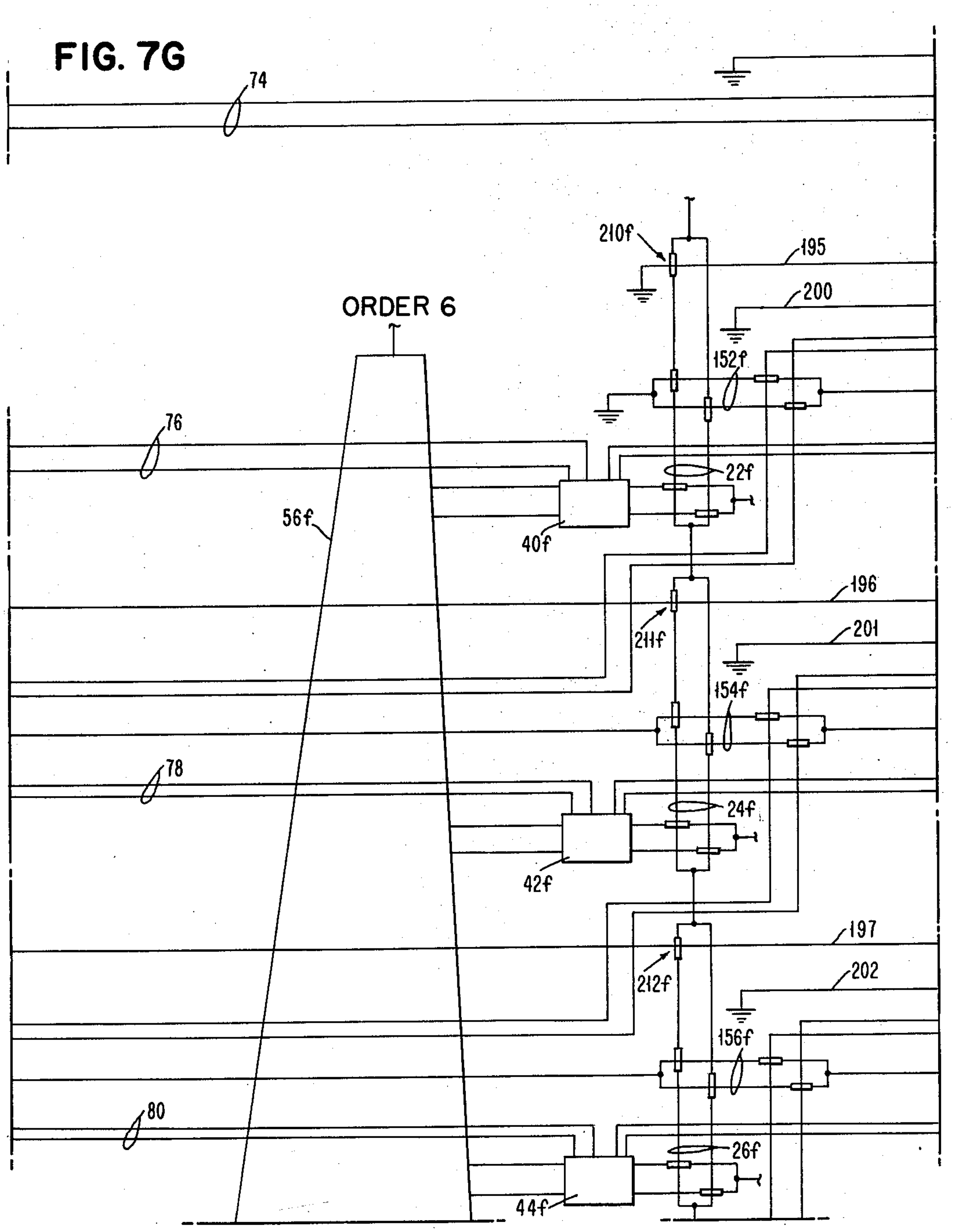
Figure 7H:
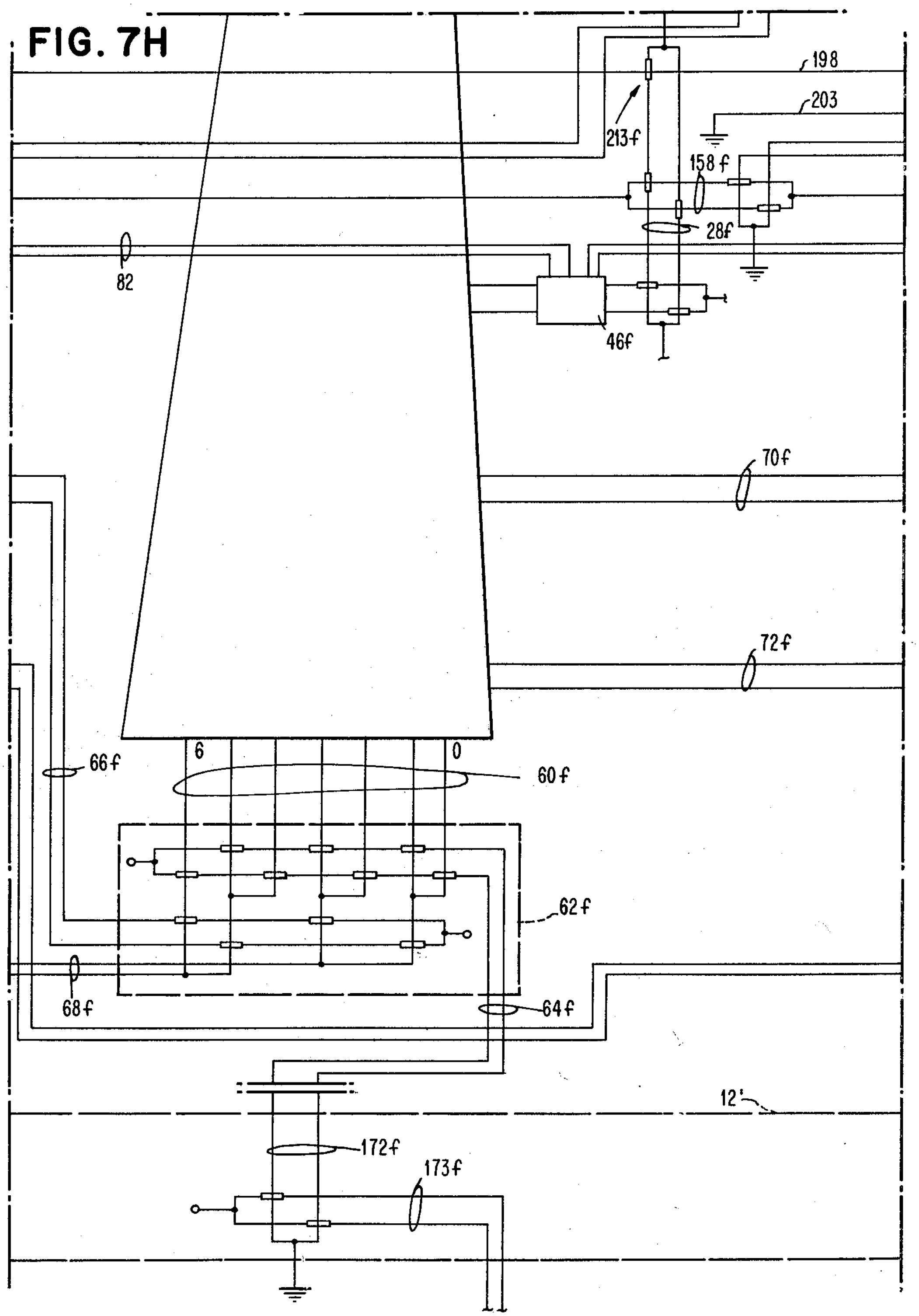
Figure 7I:
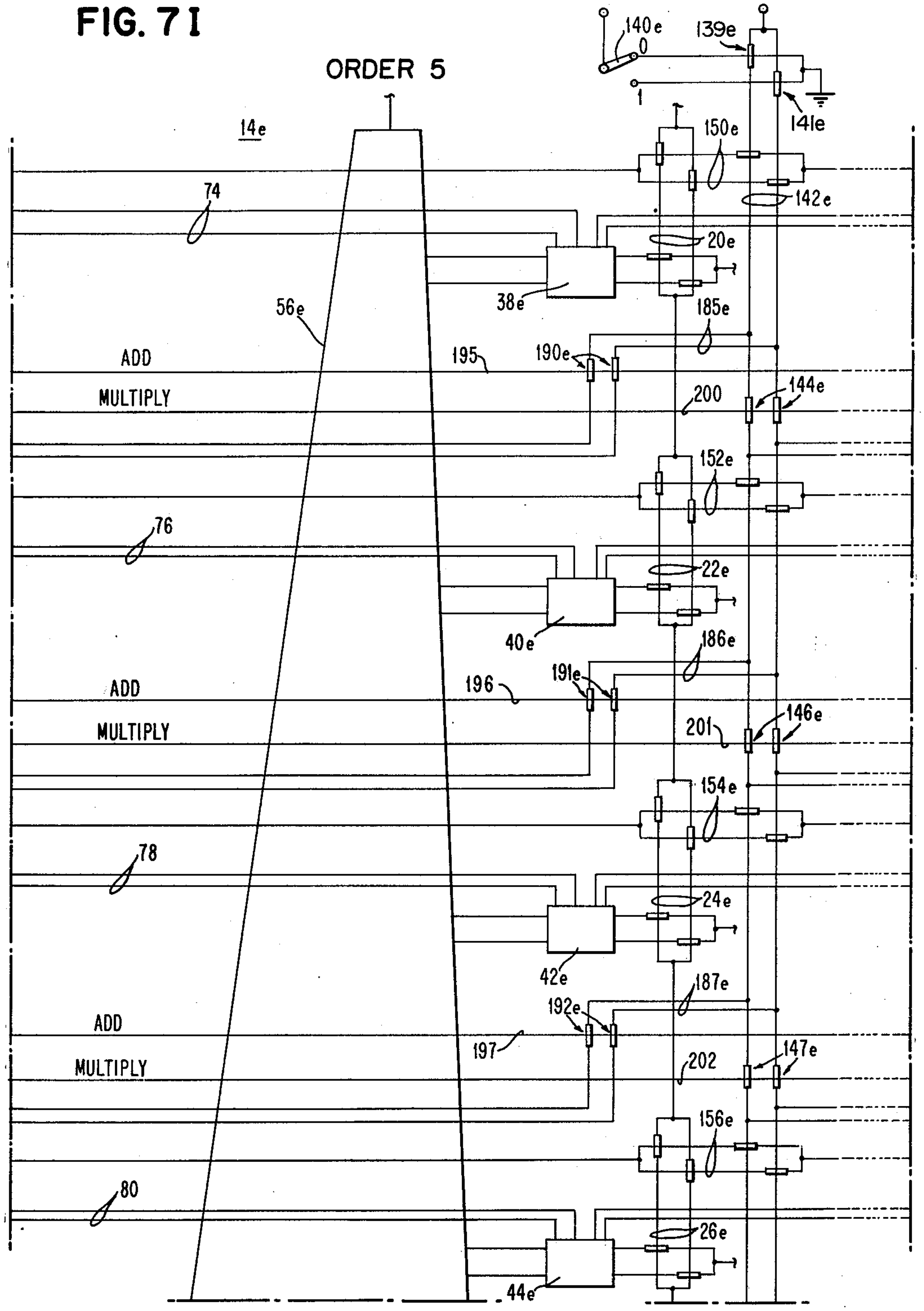
Figure 7J:
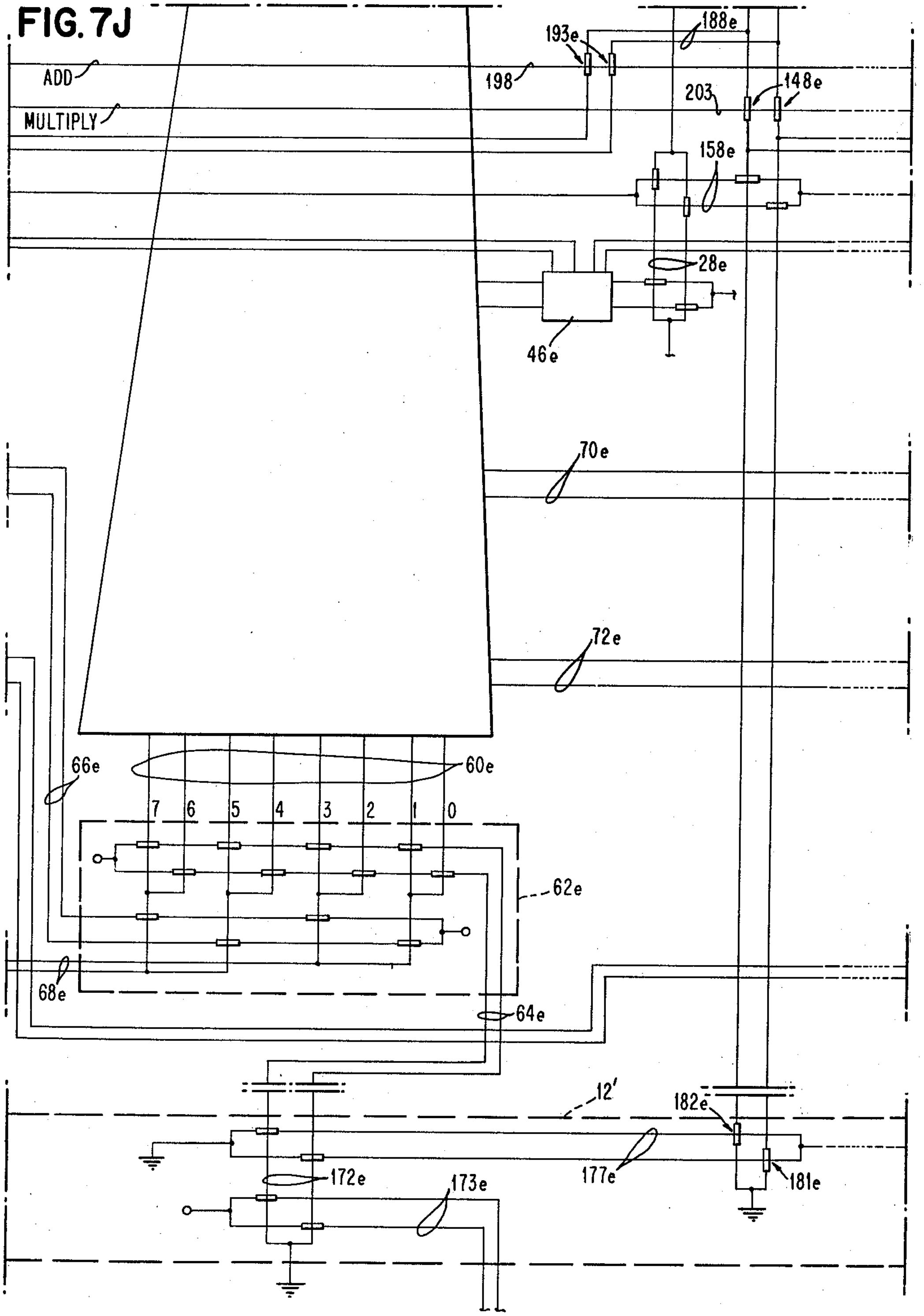
Figure 7K:
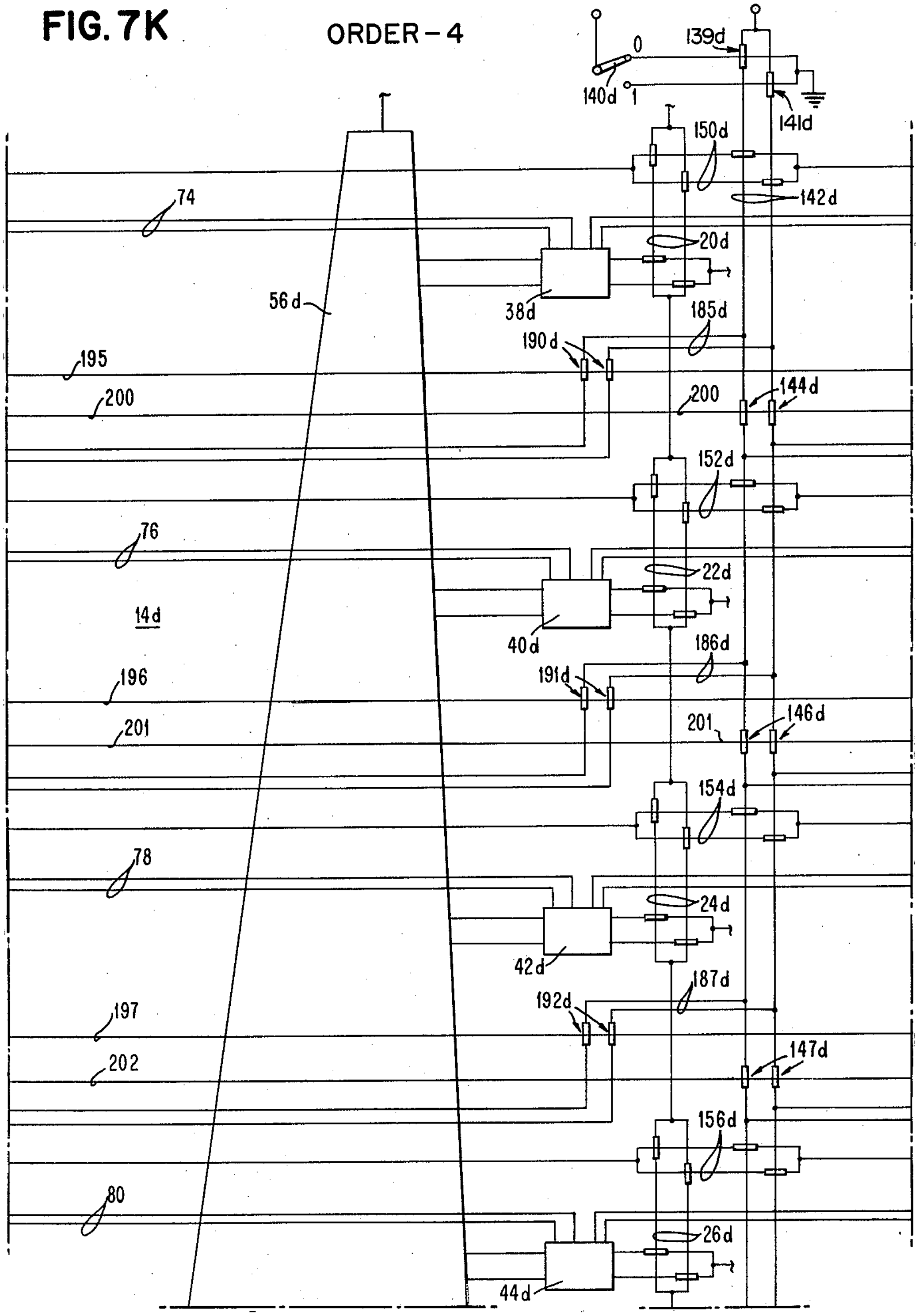
Figure 7L:
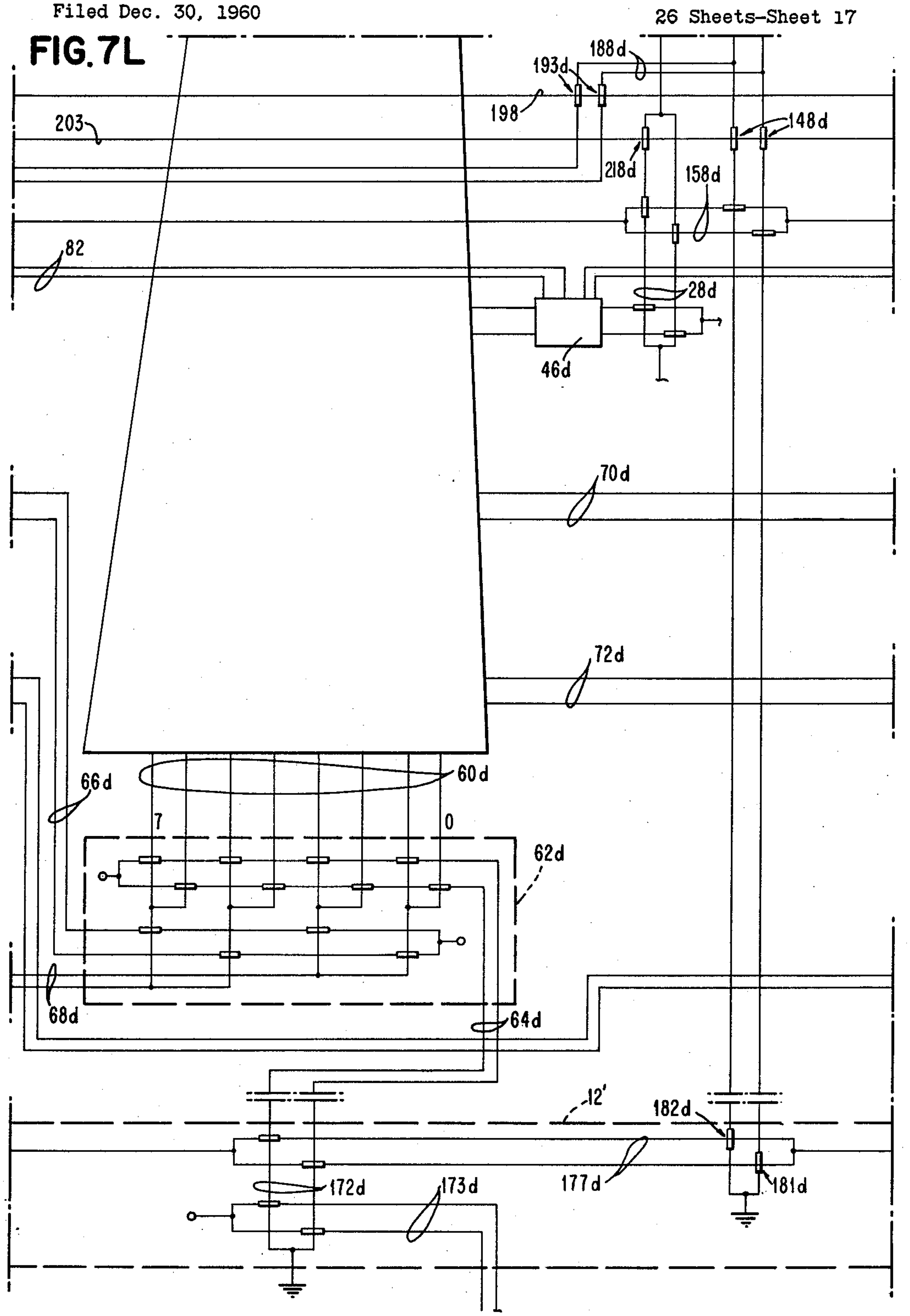
Figure 7M:
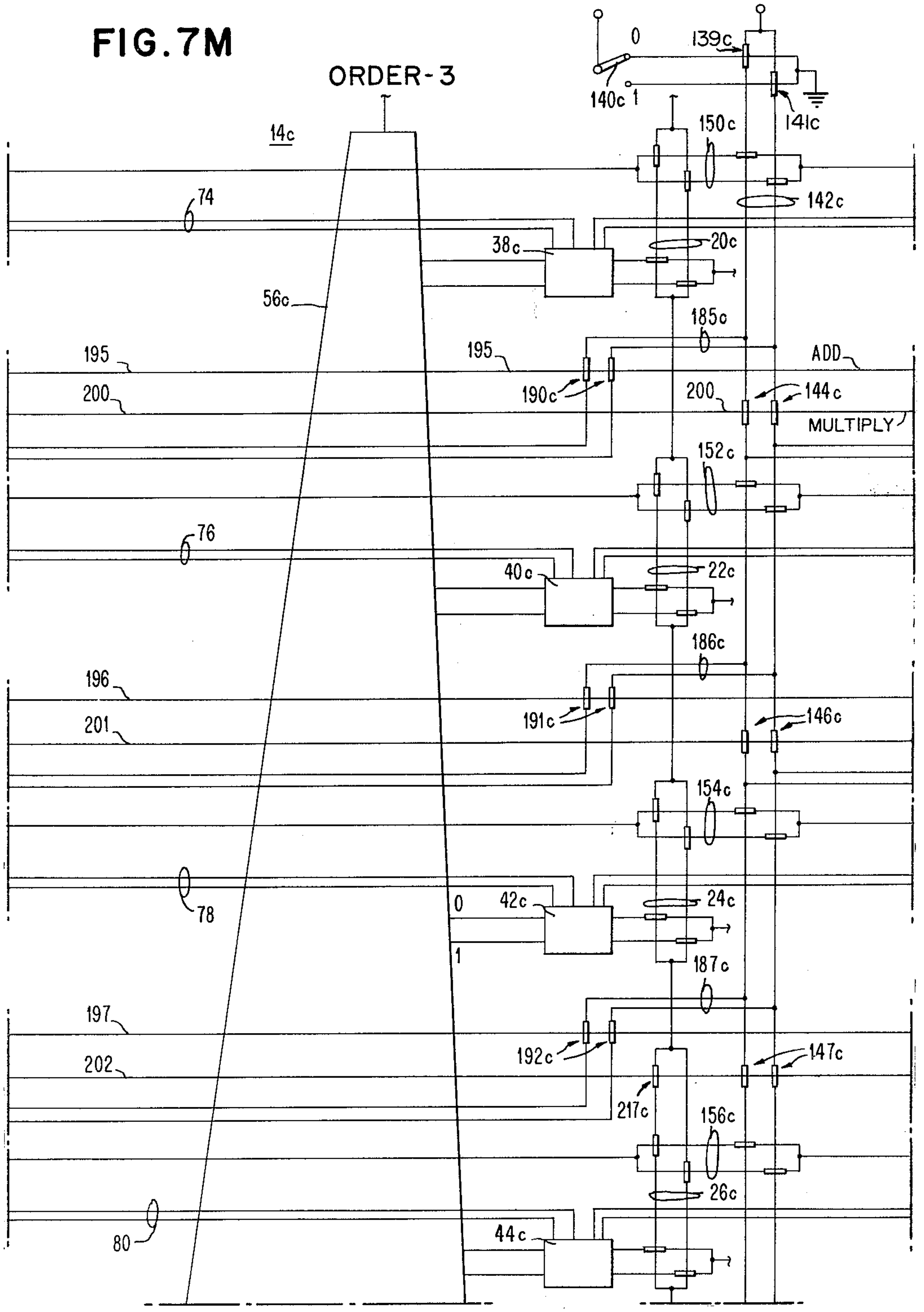
Figure 7N:
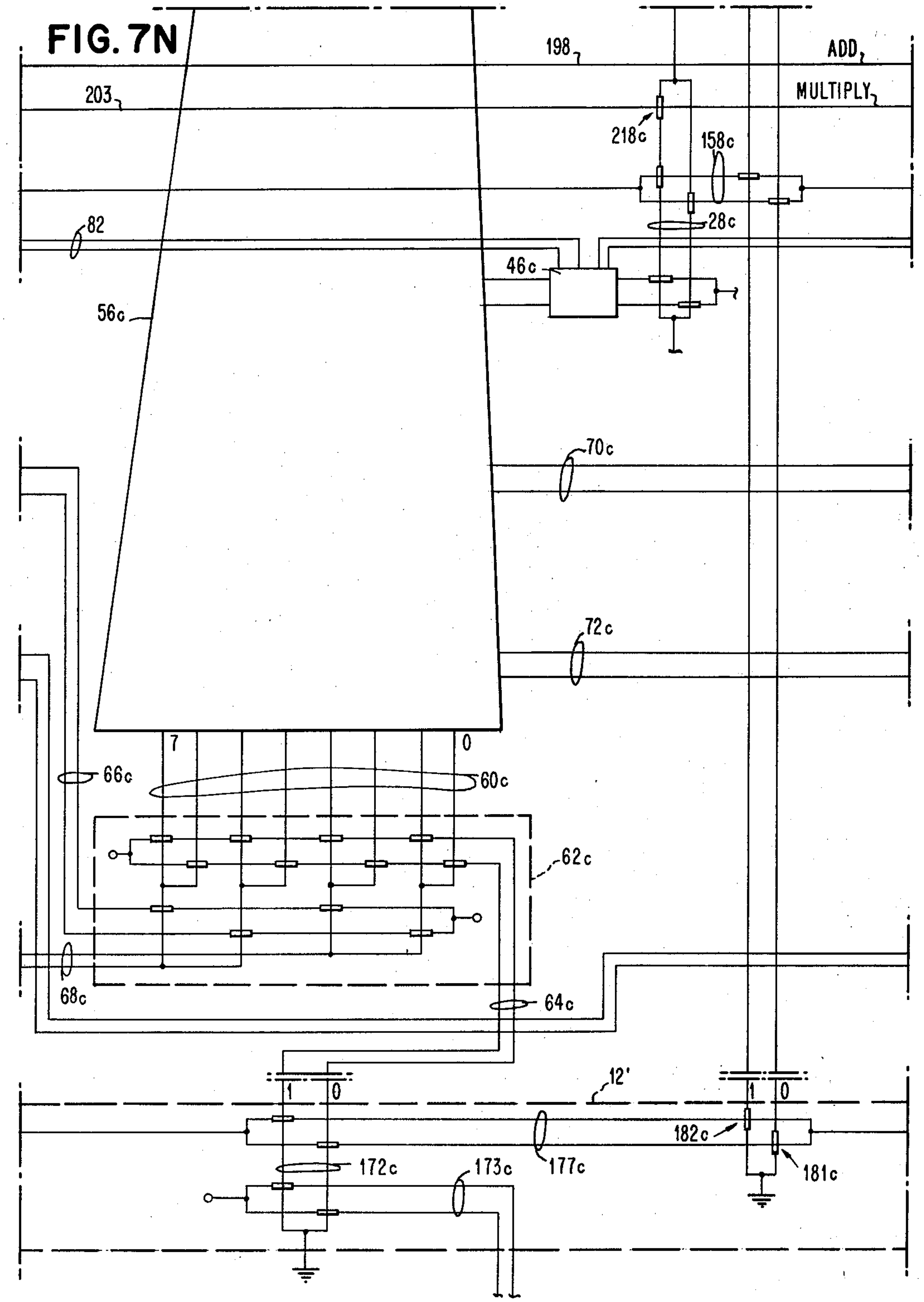
Figure 7P:
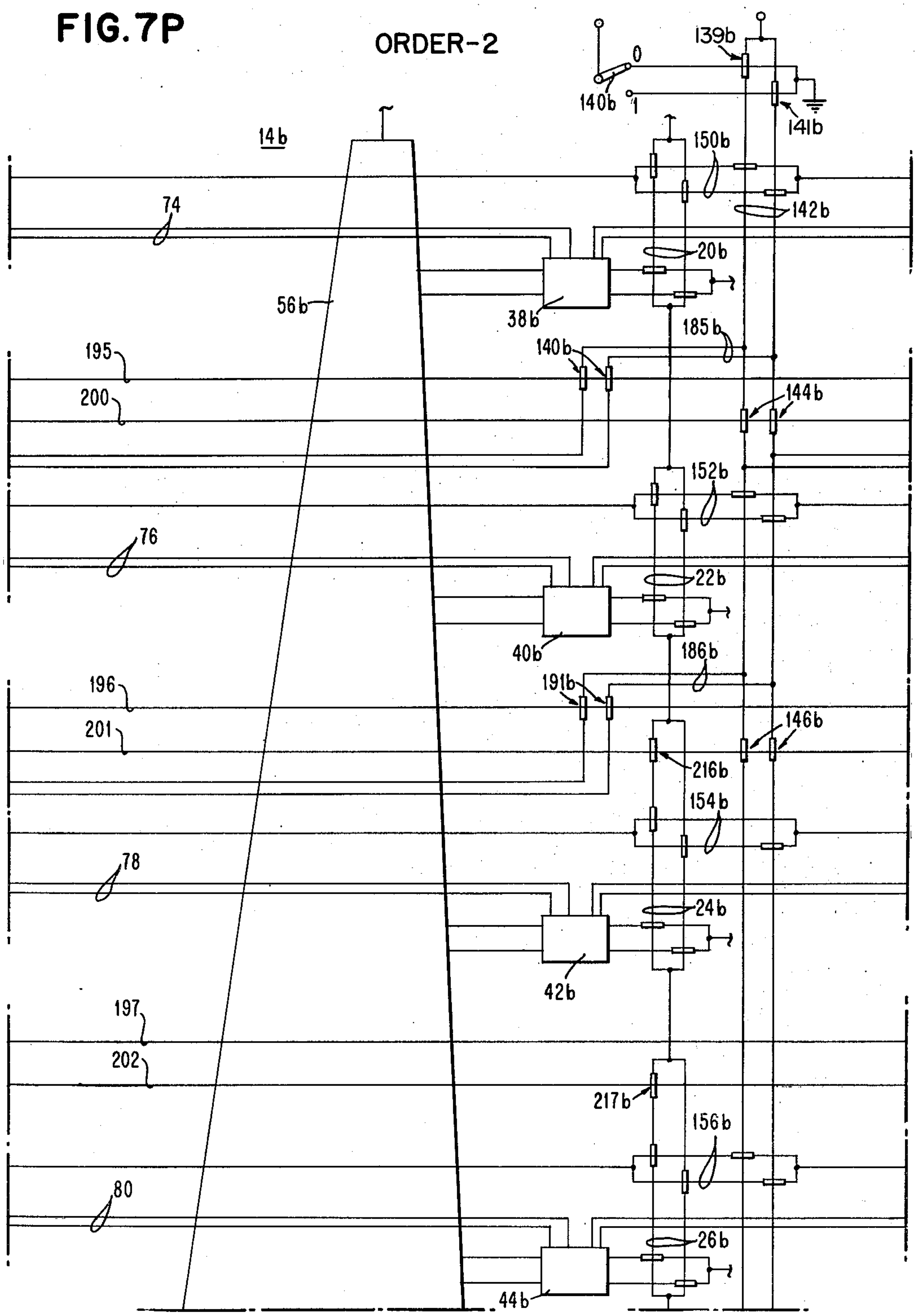
Figure 7Q:
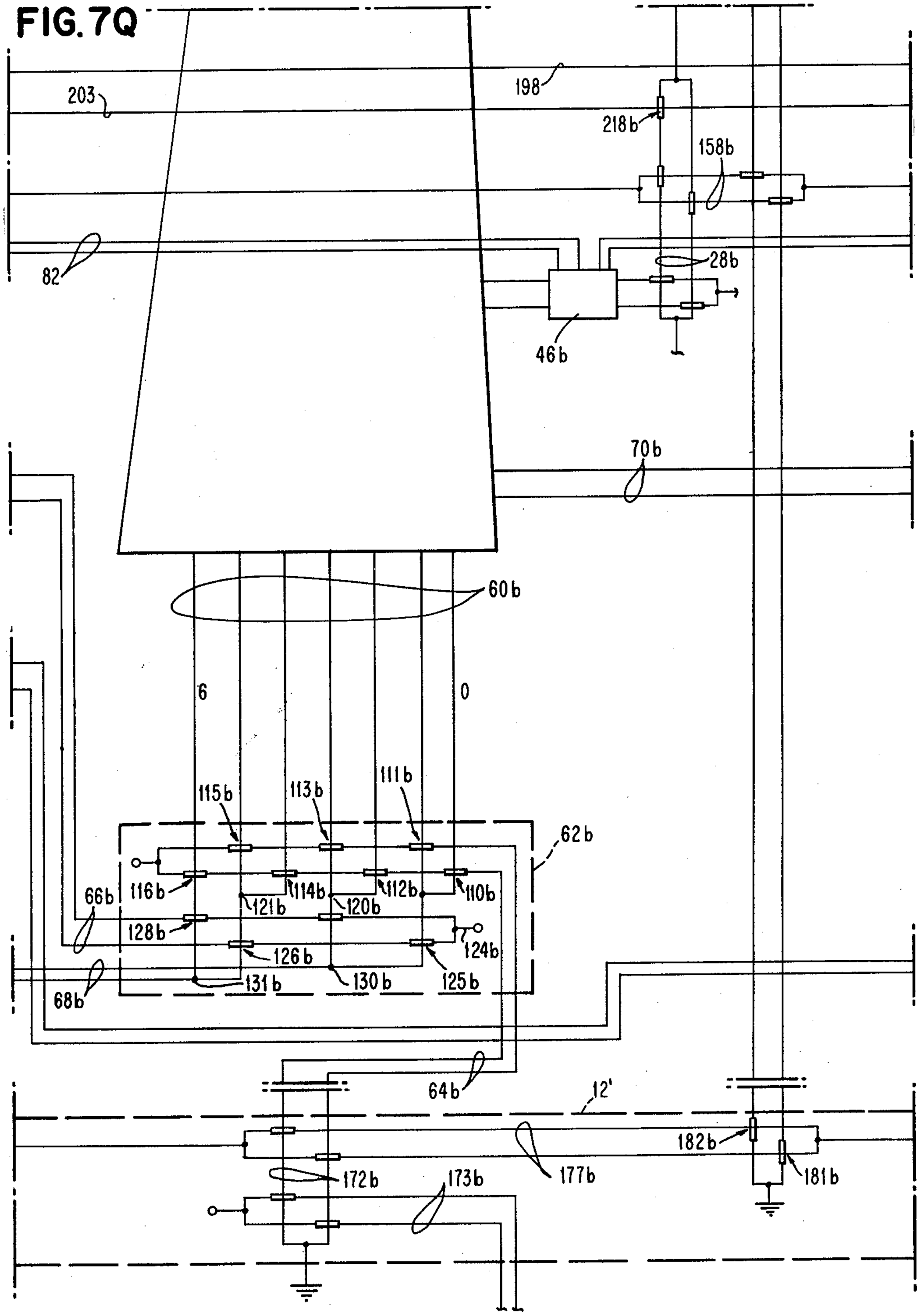
Figure 7R:
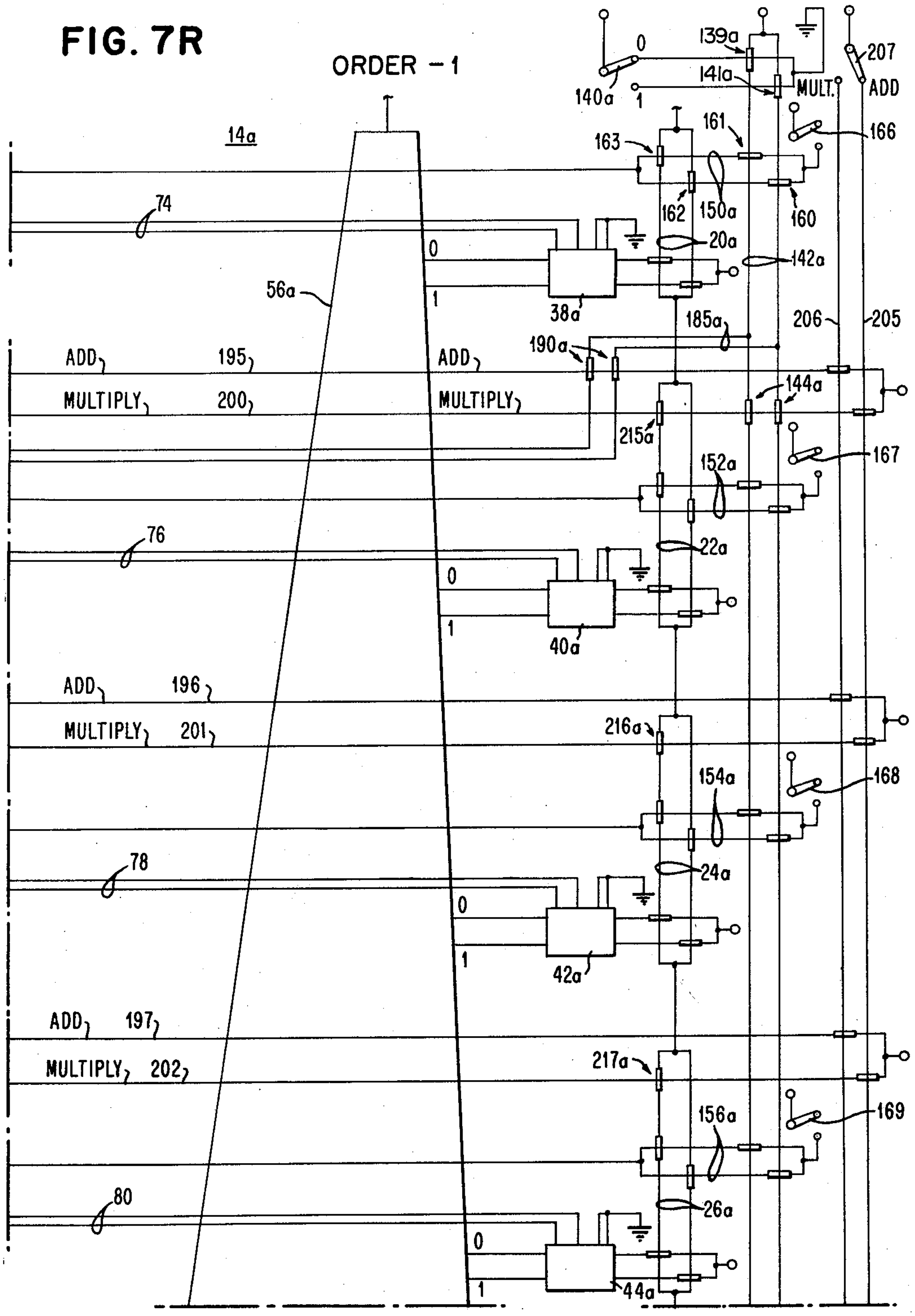
Figure 7S:
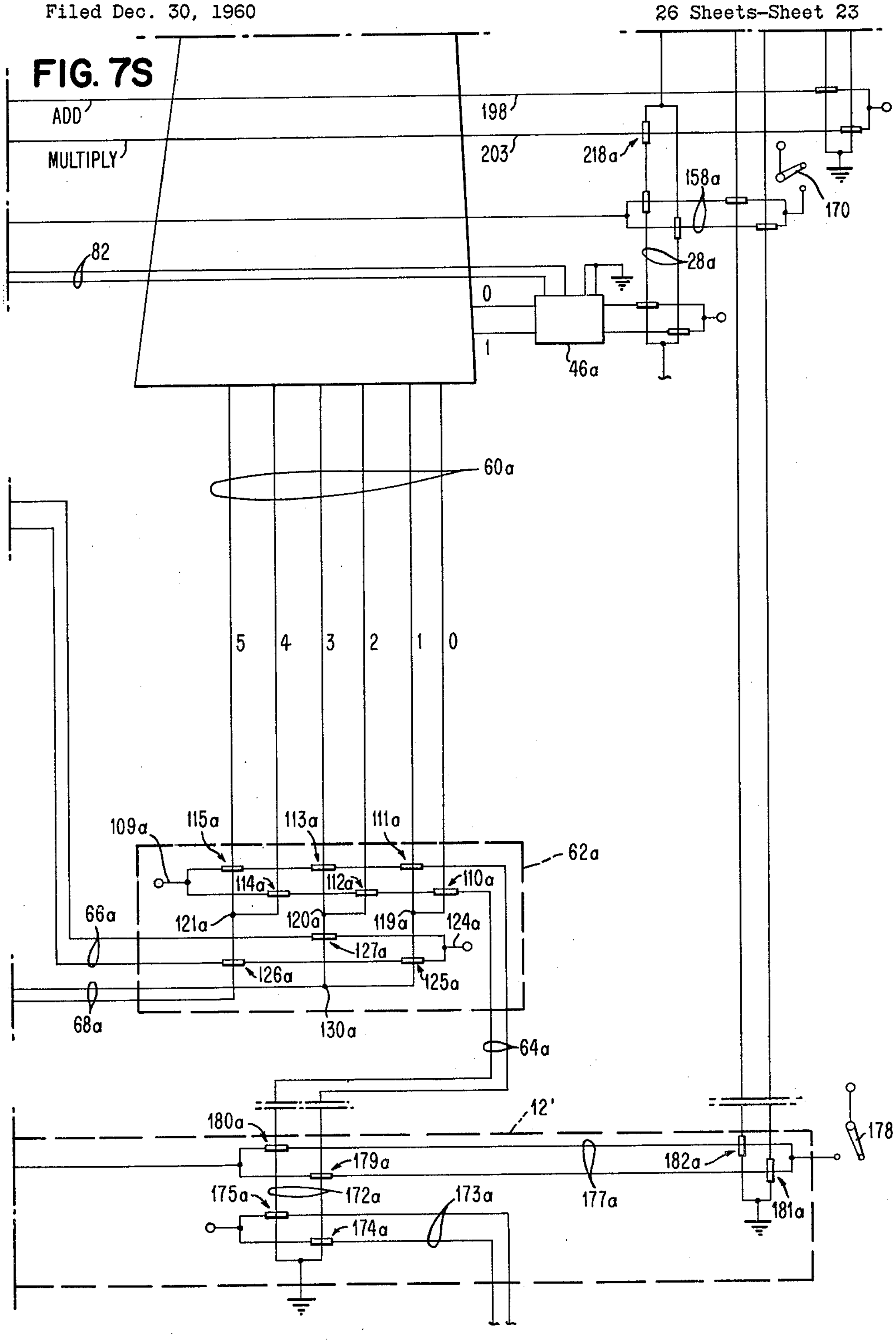

FIGURE 7 is a diagram which incorporates by reference FIGURES 7A through 7S and which shows the manner in which FIGURES 7A through 7S must be arranged to form a schematic diagram of a cryogenic embodiment of the system of the present invention which is capable of rapid addition or multiplication of five character words.

FIGURES 7A through 7S are sometimes collectively referred to hereinafter as FIGURE 7. FIGURE 7 illustrates a further elaboration of the system of FIGURE 1 and the cryogenic embodiment of FIGURE 4. However, FIGURE 7 illustrates a complete system of limited size rather than merely a column or two as illustrated in FIGURES 1 and 4. It is capable of adding up to five five-bit binary words, and of forming a product of two five-bit binary words. It will be apparent from the following description that the size of the system as illustrated in FIGURE 7 can be easily expanded as desired so that it is capable of handling words of greater length and a greater number of words.

In addition to showing the entire organization of a system, important features shown in FIGURE 7 relate to appropriate apparatus for the purpose of writing information into the various character storage cells, a function referred to but not disclosed in FIGURES 1 through 6. The first five orders of the system shown in FIGURE 7 (FIGURES 7I through 7S) are each substantially identical to column section 14 as shown in FIGURE 4A except for the addition of write-in apparatus for writing information into each of the character storage cells, and the addition at the bottom of each column of a more elaborate showing of a sum register 12' corresponding to the sum register 12. For the purpose of tying together the descriptions of FIGURES 7 and 4, all the reference numerals for the first order column shown in FIGURES 7R and 7S will have the suffix "*a*" and corresponding numerals will be used again for the higher orders, with a suffix "*b*" used for the second order, "*c*" for the third order, "*d*" for the fourth order and "*e*" for the fifth order, etc. Wherever the parts referred to correspond precisely with similar parts already disclosed in FIGURE 4, the same numerals will be used for those parts in FIGURE 7, except for the addition of the appropriate suffix.

To promote clarity in FIGURE 7 and to emphasize the features shown in FIGURE 7 which have not been shown in prior figures, in the select-suppress units 38*a* through 46*a*, and in the counting network 56*a* (and in the corresponding parts for other orders) the internal circuits have been omitted and the presence of these particular circuits has been indicated in each case by an appropriately labelled block. It is to be understood that each of these circuits may be identical to the corresponding circuits shown and described in connection with FIGURE 4A. The only exception to this is that in certain orders, there is no need for the counting network to count to a possible full seven "one" bits and the counting network for such orders is modified only by the deletion of any lower counting levels which are not needed. Thus, for instance, in the first order counting network 56_a_, a counting capacity is required only for five word bits since there can be no carries from any lower orders. Accordingly, the counting network 56_a_ corresponds exactly with the first five levels of the counting network 56 shown in FIGURE 4A. The output connections 60_a_ from the counting network 56_a_ are thus reduced in number to six, signifying the possible values 0 through 5, and the associated decode network 62_a_ is correspondingly reduced in size since the cryotrons relating to the six and seven count as shown in decode network 62 in FIG. 4A can be omitted.

Similarly, since there is no possibility of a $C_2$ input to the second order counting network 56_b_, this network is limited to six counting levels and the corresponding decode network 62_b_ is similarly limited to the structure necessary for the decoding of a count of zero through six.

In the tenth order, while there are two sets of input connections, there is never the concurrent presence of both a $C_1$ and $C_2$ input and the network 56_k_ is correspondingly abbreviated, with no $C_1$ or $C_2$ outputs required. Since the output of network 56_k_ must always be either "0" or "1," no decode network (62_k_) is required. As previously mentioned, the system of FIGURE 7 is capable of adding up to five five-bit words, and is alternatively capable of multiplying to obtain the product of two five-bit words. When employed for addition, the numerical words to be added are stored in the character storage cells associated with the first five orders shown in FIGURES 7I through 7S.

When employed for multiplication, the multiplicand, consisting of up to five characters, is stored in the character storage cells of the first word level in orders one through five, and is likewise stored in word levels two through five, but in successively shifted positions. Thus, the multiplicand is stored in the second word level in orders six through two, in the third word level in orders three through seven, in the fourth word level in the orders four through eight, and in the fifth word level, in the orders five through nine. These multiplicands, stored in respectively shifted positions, each represent possible partial products. The word read out select-suppress circuits 74 through 82 for words one through five are respectively controlled in response to the values of the lowest to the highest order bits of the multiplier, each zero bit value causing a suppress signal and each one bit value causing a select signal. Thus, possible partial products stored in word levels corresponding to any multiplier "one" bit will be counted, and any possible partial product stored in a word level corresponding to a multiplier "zero" bit will be suppressed and not counted.

In order to clarify the above brief explanation as to how the present system accomplishes multiplication, the table presented below which is entitled "Example I" illustrates how the system operates with a multiplicand represented by the binary number 1 0, 1 0 1 and a multiplier represented by the binary number 1 0, 0 1 1 to generate the binary product 1 1 0, 0 0 1, 1 1 1.

*Example I*

| Multiplier Controls 1 0 0 1 1 | | Stored Multiplicand Possible Partial Products | Word Levels |
|---|---|---|---|
| 1 (lowest) | Select | 1 0 1 0 1 | One |
| 1 | Select | 1 0 1 0 1 | Two |
| 0 | Suppress | ~~1 0 1 0 1~~ | Three |
| 0 | Suppress | ~~1 0 1 0 1~~ | Four |
| 1 (highest) | Select | 1 0 1 0 1 | Five |
| PRODUCT | | 1 1 0 0 0 1 1 1 1 | |

A more detailed explanation of the structure and the operation of the system of FIGURE 7 for addition is as follows: At the top of the diagram for each of the first five orders there is schematically illustrated a single pole double throw write-in switch 140_a_ through 140_e_. These switches are designed to switch currents through cryotrons 139_a_ through 139_e_ and 141_a_ through 141_e_ alternatively to one or the other of associated pairs of conductors designated 142_a_ through 142_e_ for the purpose of indicating binary digit values whenever such values are to be written into the memory. Each pair of 142 conductors may be referred to below as constituting a write bus or as write bus conductors. Following the previous conventions employed in the systems disclosed in this application, current on the right conductor of each pair indicates a binary zero, and current on the left conductor indicates a binary one. The 142 write bus conductors are each extended vertically downward through gates of pairs of cryotrons. For instance, in the fifth order, these pairs of cryotrons are indicated at 144_e_ through 148_e_, and corresponding pairs appear in the other orders, except that they are in reduced numbers in the first three orders. When information is being written into the system for purposes of addition, the gates of cryotrons 144_e_ through 148_e_ and of corresponding cryotrons in other orders are all open so that the vertical extension of the 142 write bus conductors is completely effective. At each character storage cell 20_a_ through 28_a_ et seq. in the first five orders, a write-in loop is provided for writing information from the associated column write bus conductors 142_a_ into the storage cell loop itself. These write-in loops are respectively designated 150 through 158, with the proper letter suffix for each order. As indicated at write-in loop 150_a_, each write-in loop includes cryotrons 160 and 161 having gate circuits in the write loop and control circuits traversed by the write bus conductors 142_a_, and cryotrons 162 and 163 having control windings traversed by the write loop conductors and having gates in the storage cell loop itself.

The write-in loops for all of the character storage positions of an individual word level may be selectively energized as schematically indicated by the switch devices 166 through 170. Accordingly, whenever a word is to be written into storage the write switch devices 140_a_ through 140_e_ are appropriately set to represent the individual bit character values of the word to be written in, and one or more of the word write-in selector switches 166 through 170 are closed for the one or more word storage positions into which the incoming word is to be written. The bit values indicated by the settings of the switches 140a through 140e are thereby written into the character storage cells at the selected word levels through the write-in loops 150a through 158a et sec.

For instance, if the first word level is chosen through the closure of switch 166, and if the lowest order bit is zero as indicated by the upper position of write switch 140a, the write bus current will traverse the control winding of cryotron 160. This closes the gate of that cryotron and forces the write-in loop current through the gate of cryotron 161 and through the control winding of cryotron 163 to force the character storage cell 20a current into the right hand branch including the gate of cryotron 162 to represent a zero bit stored value. In like manner, the opposite setting of write switch 140a to indicate a one bit value will cause the storage of a "one" branch current in the left branch of the storage cell 20a. Each of the other write-in loops operate in the same manner whenever the associated word write select switch 166 through 170 is closed.

It is a very interesting feature of this memory structure that an individual word may be written into any single word storage position or into a plurality of word storage positions, including the possibility of reading the same word into all of the word storage positions in a single write operation by simply closing all of the word write-in selector switches 166 through 170. In this fashion also, the entire memory may be "erased" or set to all zeros by simply setting all of the write switches 140a through 140e to the zero positions and by closing all of the write-in selector switches 166 through 170.

At the bottom of each order, the result storage register 12' is indicated for the purpose of receiving and storing each column sum bit. This storage takes place in the individual sum bit storage loops 172a through 172k. The sum register storage loops 172a through 172k are simply formed by an extension of the associated sum bit output pair from the last decode network in each column. At each sum register bit position a read-out loop is provided for reading out the sum values stored therein. For the first order this read out loop is indicated at 173a and includes the gates of cryotrons 174a and 175a. By means of the read-out loops 173a through 173k, the information appearing in the sum register 12' may be delivered to any other desired apparatus (not shown). It will be apparent that a number of other read-out loops corresponding to 173a through 173k may be provided to read the sum simultaneously or in any sequence if desired, to a number of different locations. Additional read-out loops may also be provided in the bit positions for each of the first five orders within the register 12' for reading the sum bits into the write bus conductors 142a through 142e, as vertically extended downward to the sum register. These additional read-out loops are designated 177a through 177e, and they may be simultaneously energized by the closure of a switch schematically illustrated at 178. Each 177 read-out loop, as illustrated for instance for the first order, includes a pair of cryotrons 179a and 180a having control windings in the sum storage loop 172a and gate conductors in the read-out loop 177a, and a pair of cryotrons 181a and 182a having control windings in the read-out loops 177a and having gate conductors in the extensions of the write bus conductors 142a.

It will be apparent that a multiple digit sum appearing in the first five order positions of the register 12' may be read out through the read-out loops 177a through 177e to the extended write bus conductors 142a. The sum may thus be written into one or more of the word storage positions by the closure of one or more of the switches 166 through 170 which causes the writing of the information on the write bus conductors into the corresponding word storage cell positions. It will be apparent that for the read-out loop 177a to be effective write bus information switch 140a must be in an open position so as not to control the currents in write bus 142a.

It is also possible through the use of the apparatus thus far described to take a numerical word which is stored in one storage position and shift it for storage in another word position. This is done by setting all of the word select-suppress circuits to the suppress mode, except for the word position which is storing the word which is to be transferred. Suppose for instance that a word is to be transferred from the first word position to the fourth word position. All of the read-out select-suppress circuits are then set to suppress, except for the select-suppress circuits for the first word which is set to "select." This one word is then fed into the column adding circuits and since no other words are added to it, it appears without addition or alteration in the sum register 12'. The sum register read-out loops 177a through 177e are energized through the closure of switch 178 to thus read the word into the extended write bus conductors 142a, and the fourth word position write-in select switch 169 is closed to activate the write-in loops 156a through 156e to store that word in the fourth word storage position.

When the system of FIGURE 7 is used for multiplication, the five word levels are employed for the purpose of storing the five digit multiplicand in successively shifted positions. These successively shifted multiplicands thereby form possible partial products which are respectively read out into the adding circuits for each of the orders by placing the word select-suppress circuits under the control of information provided by the multiplier.

The writing into memory of the multiplicand, in successively left-shifted positions, is accomplished by inhibiting all of the gates of the cryotrons such as 144e through 148e in the fifth order which form extensions of the write bus conductors 142e (and the corresponding cryotrons in the write bus conductor extensions in the other orders) and by thus forcing the write bus currents into left-shift branch circuits, as indicated for the respective word levels in the fifth order, for instance, at 185e through 188e. These left-shift write branch circuits respectively include the gate circuits of cryotrons as indicated at 190e through 193e. Corresponding left-shift write-in branch circuits and cryotrons are provided for each of the other orders, as required. Each of the left-shift branch write circuit cryotrons such as 190e through 193e have their control windings in series with "addition" control lines. These "addition" control lines are respectively designated as 195 through 198. Similarly, each of the cryotrons 144e through 148e have their control windings in series circuit in "multiplication" control lines respectively numbered 200 through 203.

The "addition" control lines 195 through 198, and the "multiplication" control lines 200 through 203, are commonly controlled through a master addition-multiply circuit shown at the right margin of FIGS. 7R and 7S, including cryotrons having gate circuits in each of the addition and multiplication control lines 195 through 198 and 200 through 203. Common control circuits for the control windings of those cryotrons include an "addition" circuit indicated by line 205, and a multiplication circuit indicated by line 206, and a selector switch schematically indicated at 207 for selecting the addition mode of operation or the multiplication mode of operation. An examination of the branch write-in circuits 185e through 188e, and the corresponding branch write-in circuits for the other orders, shows that these branch circuits provide effectively a modification of the write circuits 142a through 142e such that these write circuits now extend diagonally downward and to the left. If the write switches 140a through 140e are now set to indicate the multiplicand character bits, and all of the word level write-in circuits are energized by the closure of switches 166 through 170, the multiplicand will be simultaneously written and stored in all five of the word levels, but with a one order left-shift in each successive word level. Thus, the multiplicand will be stored in orders one through five at the first word level, in orders two through six in the second word level, in orders three through seven in the third word level, etc.

To further clarify the explanation of this left-shifting write-in circuitry, the operation of an individual character write-in circuit will be described in detail as follows: The third order multiplicand bit will be indicated by a current signal from switch 140*c* in write bus conductors 142*c*. This bit will be written into the third order first word bit storage loop 20*c* through the write-in loop 150*c*. Since the multiply control line 200 carries current and the add control line 195 does not, the gates of cryotrons 144*c* are closed and the gates of cryotrons 190*c* are open so that the read-in bus 142*c* is effectively extended downward and to the left to connect with the write bus conductors at the second word level extending between cryotrons 144*d* and 146*d*. Thus the third order multiplicand bit is written into the fourth order bit position of the second word level. This is the storage cell 22*d*, and the read-in is accomplished through write loop 152*d*. Since the gates of cryotrons 144*d* and 146*d* are all closed by the multiply control currents in the control lines 200 and 201, this multiplicand bit can be effective only in the fourth order to read or write into the second word level. Furthermore, this multiplicand bit is again shunted to the left and downwardly through branch circuits 186*d* including the cryotron 191*d* gates to write in the third word level in the fifth order in storage cell 24*e*. In similar fashion this third order multiplicand bit is further written into storage in character storage cells 26*f* and 28*g*.

Since the storage cells of the orders six through nine are not employed for operation of the system for addition, but only for operation of the system for multiplication, there is no need for counterparts of the write circuit switching cryotrons 144*e* through 148*e* and 190*e* through 193*e* in any order above the fifth order. This is true because the circuits which can be closed through the gates of cryotrons 144*e* through 148*e* in the fifth order need not be provided at all in the sixth and higher orders. However, since the adding circuits of the sixth and higher orders are employed for receiving carries from lower orders when the system is being operated only for addition of words stored in the first five orders, the storage cells of the sixth and higher orders must be set to zero. For this purpose, an additional cryotron is provided in each of these storage cell loops as indicated for instance at 210*f* through 213*f* in the sixth order. Each of these cryotrons has a control winding in one of the add control lines 195 through 198 to force each of the associated storage cell loops to the zero state whenever the system is employed for addition.

Similarly, certain lower order storage cells in the second through the fifth word levels are not used during the operation of the system for multiplication because of the left-shift storage of the multiplicand partial products. These storage cells unused during multiplication include all cells in the second word level, and below, in the first order (cells 22*a* through 28*a*), and in the second order cells 24*b* through 28*b*, in the third order cells 26*c* and 28*c*, and in the fourth order cells 28*d*. Therefore, in all of these storage cells just mentioned, an extra cryotron is provided, as indicated for instance at 215*a* through 218*a* in the first order, each of which has a control winding circuit in a "multiply" control line to force each of these storage cells to zero whenever the system is operated for multiplication.

The read-out select-suppress lines 74 through 82 for the words one through five are employed, as explained previously in connection with FIGURE 4, for the purpose purpose of selecting the read-out of each of the words into the adding circuits, or for suppressing that read-out by forcing all of the digits of a suppressed word to appear as zeros to the adding circuit. These select-suppress control line circuits, and the select-suppress units, are included in the system of FIGURE 7. As shown in FIGURES 7A and 7B, select-suppress circuits 74 through 82 are under the control of select-suppress input circuits including select-suppress input switches schematically shown at 221 through 225. This control is exercised by means of switching cryotrons having controls in the input circuits and gates in the control circuits as indicated at 228 through 237.

When the system of FIG. 7 is employed for operation in the addition mode, the word select switches 221 to 225 for all words which it is desired to add are set to the right hand position, the "select" position as shown in FIGURE 7A, and for words which it is not desired to add, the corresponding switch is shifted to the suppress position. However, when the system of FIGURE 7 is employed for multiplication, the select-suppress input switches 221 to 225 are set according to the values of the multiplier digits, a setting of "select" corresponding to a "one" digit, and a setting of "suppress" corresponding to a "zero" digit. In this mode of operation, the lowest order digit of the multiplier determines the setting of switch 221 for word one and the highest order digit determines the setting of word five switch 225. Thus, for instance, in the "Example I" previously given to illustrate the operation of this system for multiplication, with a multiplier of 1 0 0 1 1, the select-suppress input word switches 221 through 225 would respectively have the settings SELECT, SELECT, SUPPRESS, SUPPRESS, SELECT reading left from the low order bit. It will be appreciated, of course, that separate select-suppress input controls can be provided for supplying the multiplier inputs during multiplication, and for supplying the word selection signals during addition. Each set of controls can be automatically disabled by the add and multiply control circuits whenever the other mode of operation is selected.

Throughout the system of FIG. 7, various information input and control switches are illustrated schematically as manual switches. However, it will be understood that other switching devices may be employed. Furthermore, direct manual switch control of cryogenic circuits may present difficulties because of the very low impedances involved in cryogenic circuitry. Accordingly, the showing in the drawings of these switches is purely schematic as more sophisticated switching will generally be employed.

It is apparent that if desired, column sections 14*f* et seq. for the sixth and higher orders may be full size, and the system of FIG. 7 is then capable of adding words containing up to eight characters, without impairing the capability of multiplying two five character words. The size of the system illustrated in FIG. 7 is purposely limited to avoid unnecessary duplication. However, words of any desired size may be accommodated in a system as taught by FIG. 7 by simply widening the system with the insertion of additional column sections 14*e* such as are employed for the fifth order column. Furthermore, as previously indicated in connection with the descriptions of FIGS. 1 and 4, the system may also be expanded vertically to accommodate for any desired number of words by inserting additional column sections beneath the sections 14*a* through 14*j*, and above the sum register 12'. These inserted sections are substantially identical to column section 16 as disclosed in FIG. 4B, with the additional write-in apparatus corresponding to that disclosed in sections 14*a* through 14*e* of FIG. 7. It will be understood, of course, that in such an expanded system, additional high orders are required to take care of the increased carries which must be anticipated. In a binary system such as that illustrated, an additional order for carries will be required every time the word size of the system is doubled. By expanding the word capacity and extending the diagonal write-in feature, multiplication with larger multipliers may be accomplished.

While all of the embodiments of the invention described above are based upon column sections having counting networks which are capable of counting up to seven and with decode networks for generating binary first and second order carries $C_1$ and $C_2$, it will be understood that other column section sizes may be employed without departing from the scope of the present invention. For instance, each column section may be limited to a count of only three, generating only a first order carry $C_1$ in addition to the sum. It is also possible to provide a larger column section which is capable of counting up to fifteen, for instance. In such a system, an additional carry signal $C_3$ to the third order would be generated. Furthermore, it is apparent that the decoding network 62 may be modified to convert the count from the counting network to signals which represent the count in numbering systems other than the binary system employed in these embodiments of the invention.

The left-shift write-in feature used for multiplication in the system of FIGURE 7 may be employed, if desired, to derive directly values of a number increased by factors which are powers of two. Thus, a left-shift by one order corresponds to a multiplication of the number by two, a left-shift by two orders corresponds to multiplication by four, etc.

The system of FIGURE 7 may be simplified, if desired, for the purpose of specializing the circuit to perform only addition or only multiplication. For addition only, the left-shift write-in circuits **185*e* through 188*e* including cryotrons 190*e* through 193*e*, and their counterparts in other orders, may be omitted, and the cryotrons 144*e* through 148*e*** and their counterparts which divert the write currents to the left-shifting write-in circuits may likewise be omitted, with straight through write circuits substituted.

Similarly, for a circuit specialized for multiplication only, only the left-shift write-in circuits are provided, and the vertical continuations of the 142 write busses, including the cryotrons **144*e* through 148*e***, would be omitted.

While the geometry of FIGURE 7 has been described in terms of providing a progressively diagonally shifted write-in of possible partial products, and with adding circuits arranged by order columns, it would be possible to substantially modify the system as used for multiplication by storing the possible partial products in unshifted relationship and by providing special adding circuits which would add through a diagonal path. For instance, an adding circuit could be provided which would add in the fifth order at the first word level, at the fourth order in the second word level, in the third order at the third word level, and so on diagonally downward and to the right. Similar diagonal adding circuits could be provided for, as required, for all of the orders of the product, and the results would be the same as in the system of FIGURE 7. It is clear therefore that either the write bus circuits can be arranged diagonally, or the adding circuits can be arranged diagonally, and the same results are accomplished in either case. The important requirement is that one must be arranged diagonally with respect to the other.

In the operation of the system of FIGURE 7, since carries must be propagated from lower orders to higher orders before the summing operations of the higher orders can be finally completed, it may be desirable to supply currents to the adding circuits in a sequence by orders, beginning with the lowest and proceeding to the highest orders. Such a sequential operation permits the carries from the lower orders to be propagated to the higher orders at about the same time that the higher order adding circuits are energized. The progression of the sequence of adding circuit currents may be very rapid so that the speed of operation of the system is not actually impaired. This sequential operation of the adding circuits is believed to be advantageous because premature carry propagations which may later be altered are avoided and accordingly, multiple switching operations in individual carry circuits may be avoided. Without the sequential operation of the adding circuits, for instance, certain first order carries may be initially indicated but later cancelled when a higher count is achieved in the associated adding circuit which calls for a second order carry without any first order carry. With the sequenced adding circuit currents this sort of a change in the carry situation will not cause any change in the higher order sum because the higher order adding circuit will not be supplied with a current until the lower order carry propagation has been finally determined and "settled down."

While not shown in any of the cryogenic embodiments of the present system, it will be apparent that it is possible to provide a storage circuit for each carry signal in the order column to which the carry signal is to be added. This permits the saving of carries in storage which may be useful in the sequential operation of the adding circuits, particularly if the sequence is to be interrupted for some purpose.

Figure 8:
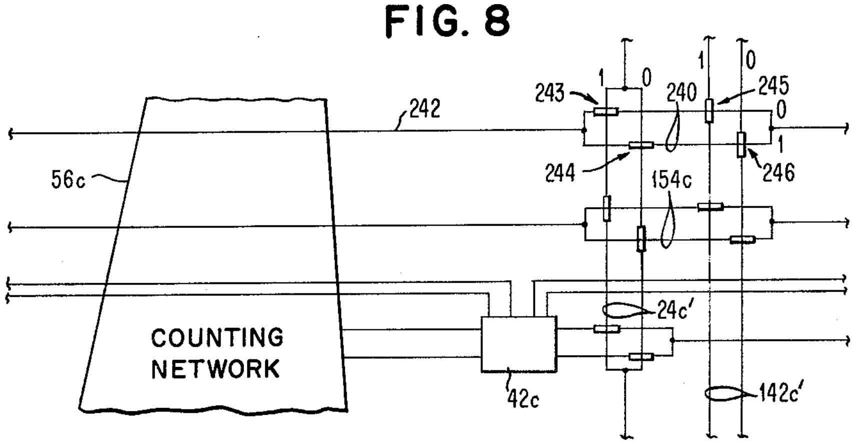
FIG. 8 is a schematic diagram showing only one character storage portion of a system such as that of FIG. 7 illustrating an added feature relating to the read-out of information from the character storage cell.

FIGURE 8 illustrates a single character storage portion of a system such as that of FIGURE 7 for the purpose of illustrating an added feature permitting direct read out to the write bus of information stored in the character storage cell. As explained previously in connection with the result register 12' of FIGURE 7, it is possible to read an individual word out through the adding circuits to the result register 12' and from there to read the word into the write bus for each column and to thus store the word in another word position, if desired. A more direct method for transferring a word stored in one position to a different position involves the provision of an additional read-out loop for reading information from the storage cell loop to the associated write bus. This is the system modification illustrated in the FIGURE 8 drawing. For this purpose, as an example, the third order storage cell **24*c* at the third word level of FIGURE 7 is modified as cell 24*c'* in FIGURE 8, and shown with the appropriate associated apparatus. The additional feature of reading from the storage cell loop out to the write bus is embodied very simply by the addition of a read-out loop 240 which is supplied with a current from a line 242. The line 242 preferably continues across to similar loops for the purpose of simultaneously reading out all of the characters associated with the particular word into the associated write busses 142. The read out of information by loop 240 is accomplished by means of cryotrons 243 and 244 having gates in the read-out loop and controls in the storage cell loop 24*c'* and by cryotrons 245 and 246 having controls in the read-out loop and gates in the write bus 142*c'***.

Figure 9:
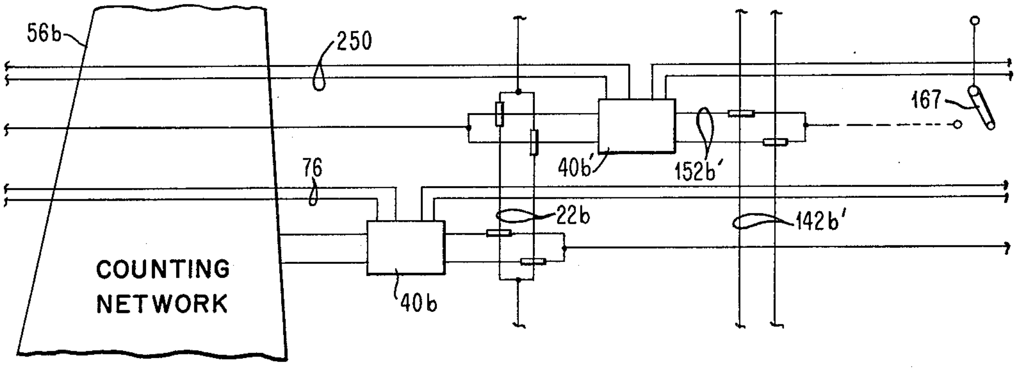
FIG. 9 is a schematic diagram showing only one character storage portion of a system such as that of FIG. 7 illustrating an added feature relating to the selective read-in of information to the storage cell.

FIGURE 9 shows an individual storage cell section of a system such as that shown in FIGURE 7, which illustrates a modification of the write loops, such as write loops **150*a* through 158*a* in the first order, by the insertion of a select-suppress unit in such write loops. For purposes of illustrating this modification, only the second order character position at the second word level is illustrated, including storage cell 22*b* and associated apparatus. In this modification, the write-in loop indicated at 152*b'* is modified by the insertion of a select-suppress unit indicated at 40*b'*. This select-suppress unit is identical in construction to the select-suppress unit 38 disclosed and described in detail in connection with FIGURE 4A, and it is thus identical in construction to the select-suppress unit 40*b* in the read-out loop from cell 22*b* to the counting network 56*b*. The write select suppress unit 40*b'*, and its associated select-suppress units in the other character storage positions of the associated word are under the control of a pair of select-suppress lines 250. By the use of this additional control afforded by the select-suppress unit 40*b'* in the write loop, it is possible to accomplish a reset to zero of any word positions which are not selected to be written into. This is accomplished simultaneously with any read-in operation, by simply controlling the write select-suppress units to "suppress" and read-in to zero, and by simultaneously closing the associated write current selector switch such as switch 167**. For other purposes, the write select-suppress unit 40*b*′ and other similar select-suppress units will generally be maintained in the "select" mode.

One special purpose for which the write select-suppress units may be employed is in the operation of the system for multiplication. The multiplier digits may be caused to control these write-in select-suppress units instead of controlling the read-out select-suppress units. Zeros will thus be recorded in all of the character positions at any partial product word level corresponding to a zero digit in the multiplier. It will be appreciated also that select-suppress units, such as 40*b*′, which are arranged in the write loops, may be controlled in accordance with individual columns, instead of in accordance with individual words, similar to the modification illustrated and described above in connection with FIGURE 6 for the read-out loops. In this manner, certain fields in each of the arithmetic words to be stored in memory can be blanked out, if desired, as the words are stored.

Figure 10:
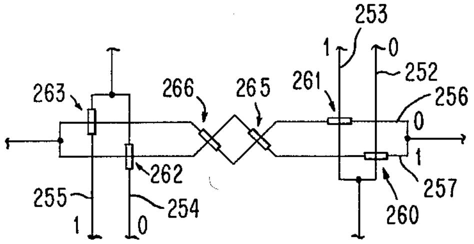
FIG. 10 illustrates how cross-coupled cryotrons may be employed in the storage and switching loops of the cryogenic embodiments of the system of this invention to enhance the switching thereof.

FIGURE 10 illustrates an arrangement of crossed cryotrons which may be employed in any of the information transfer or storage loops in the cryogenic embodiments of the present invention in order to enhance the switching in these loops. This modification involves the addition of cross-coupled cryotrons in the alternate current loop for which the switching is to be enhanced. Referring more specifically to FIGURE 10, there is shown a pair of alternate current conductors 252 and 253 from which information is to be taken and written into an alternate current storage loop including conductors 254 and 255 through a transfer or writing alternate current loop including conductors 256 and 257. For this purpose, cryotrons 260 and 261 are provided having control windings in the loop 252–253 and gates in the loop 256–257 and storage loop cryotrons 262 and 263 are provided having control windings in the transfer loop 256–257 and gates in the storage loop 254–255. The crossed-cryotrons 265 and 266 are respectively provided with gate circuits respectively arranged in the transfer loop lines 257 and 256 and with control windings respectively arranged in transfer loop lines 256 and 257. If there is a current in branch 256, indicating a zero value, that current traverses the control winding of cryotron 265 which closes the gate of cryotron 265 in the corresponding "one" branch 257. Conversely, if there is a "one" current in the branch 257, then a current exists in the control winding of cryotron 266, which closes the gate of cryotron 266 in the "zero" line 256. It is to be seen therefore that once there is a build-up of current in one of the branches 256 or 257, a corresponding decay of current is caused in the other branch because of the nature of the connections of the crossed-cryotrons 265 and 266. It will be understood that this crossed-cryotron circuitry may be added whenever it is deemed necessary or desirable in any of the storage or transfer loops in any of the cryogenic embodiments of the present invention. This crossed-cryotron or flip-flop structure, as disclosed in FIGURE 10, is a feature which has been disclosed in prior patent applications. For instance see patent application Serial Number 29,897, filed May 18, 1960, in the name of M. K. Haynes, previously mentioned above.

Figure 11:
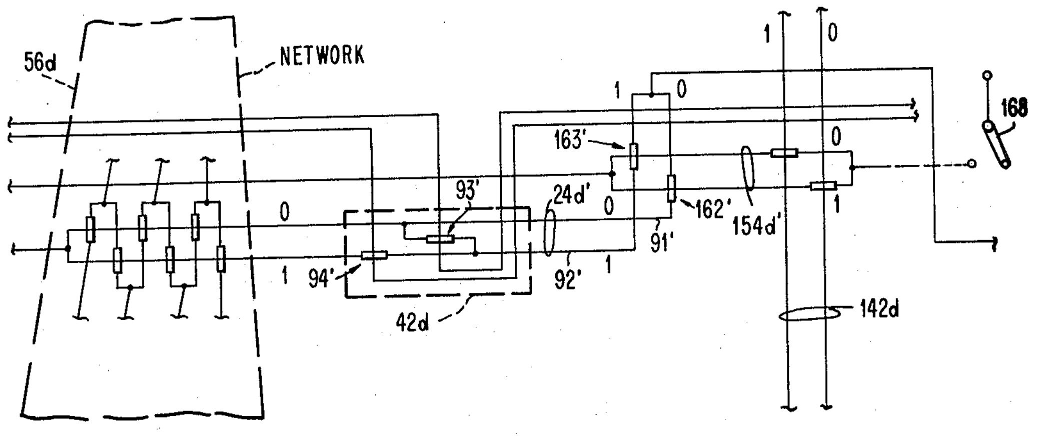
FIG. 11 is a schematic diagram showing only one character storage portion of a system such as that of FIG. 7 illustrating a modification of the character storage cell in which the character storage circuit loop and the read-out circuit loop are combined in a single loop.

FIGURE 11 illustrates how the system of FIGURE 7 may be modified in order to accomplish a circuit simplification in which each storage cell loop and the associated read-out loop may be combined in a single loop to accomplish both storage and read-out. In the detail of FIGURE 11, for instance, there is shown a modification of the storage cell for the fourth order at the third word level of FIGURE 7K together with apparatus associated with this storage cell position. The major change is that the storage cell loop 24*d* has ben modified, as shown at 24*d*′, to be directly joined in circuit with the read-out loop, instead of being coupled by cryotrons to a separate read-out loop such as shown in all the prior embodiments of the invention. The modified storage and read-out loop conductors are designated 91′ and 92′. In order to more clearly indicate how this modification operates, the internal cryotrons 93′ and 94′ and associated circuitry of the select-suppress unit 42*d* are shown, as well as the associated circuitry within the counting network 56*d*. The storage loop cryotrons which receive the information written into storage through the write loop 154*d*′ are indicated at 162′ and 163′. The write loop 154*d*′ is operable as previously indicated to write information into the storage cell loop 24*d*′ whenever the write-in select switch 168 is closed to supply current to the write-in circuits for the associated word. The read-out and storage loop including conductors 91′ and 92′ is continuously supplied with current, and the values stored in this storage cell position 24*d*′ are read into the network 56*d* whenever the select-suppress unit 42*d* is operated on "select." If the select-suppress unit 42*d* is operated on "suppress" then the suppress cryotron 94′ inhibits the current flow on the "one" output line and causes any "one" current which is present to cross over through the gate of cross-over cryotron 93′ to the "zero" line so that a zero appears at the network 56*d* for this particular character. However, even when this occurs, the nature of the "one" current in branch 92′ is not altered in the position of the storage loop to the right of the cross-over cryotron 93′. Accordingly, a "one" bit stored in this right hand portion of the combined storage and read-out loop is not modified in any way by the operation of the select-suppress unit 42*d*. Therefore his portion of the combined storage and read-out loop is reliably effective for the storage of information, even though a common current is employed to carry "ones" which may be suppressed to "zeros" to the cryotrons of network 56*d*.

Figure 12:
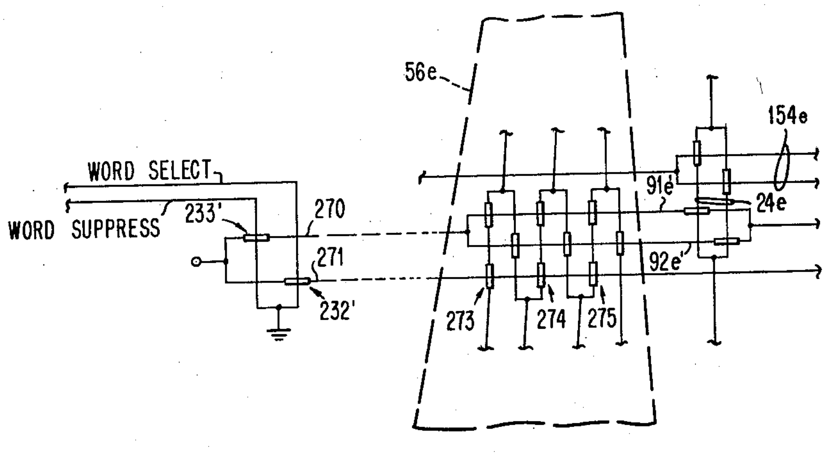
FIG. 12 is a schematic diagram showing only one character storage portion of a system such as that shown in FIG. 7 illustrating a modification in the read-out select-suppress circuitry.

FIGURE 12 illustrates another possible modification of the cryogenic embodiments of the present invention in which the select-suppress control of the read out of a character from a storage cell is accomplished by means of apparatus different from the select-suppress units previously described. For purposes of illustration, this modificaton is shown as applied to the character storage cell 24*e* in the fifth order in the third word level of the system of FIGURE 7.

The storage loop 24*e* and the read-in loop 154*e* are each unmodified. However, the read-out loop including the read-out loop conductors designated 91*e*′ and 92*e*′, is modified by the deletion of the select-suppress unit 42*e*. The read-out loop is supplied with read-out current through a supply conductor indicated at 270 which supplies the read-out current to all the characters for the third word. However, read-out current is supplied through conductor 270 only when the word is selected. If the word is suppressed, such current is diverted to a conductor 271. This switching between conductors 270 and 271 is accomplished by means of cryotrons 232′ and 233′ having control windings respectively in circuit with the word select and word suppress control inputs. Associated with the conductor 271, additional cryotrons are provided in the network 56*e* as indicated at 273, 274 and 275. These last-named cryotrons have their gates respectively arranged in series circuit relationship in the legs of the network which must be traversed by the network currents to count a "one" bit read out from storage cell 24*e*. Accordingly, whenever there is a current in conductor 271, and no current in conductor 270, the network 56*e* is forced to count a zero by the closure of the gates of cryotrons 273, 274 and 275. The network 56*e* therefore "sees" a zero at this bit position and the suppression is effective. Whenever the current is diverted from the suppress line 271 into the read loop current supply line 270, read-out of the bit characters stored in loop 24*e* proceeds in a normal manner as in the system previously described.

While all of the cryogenic embodiments of the invention as described above are based upon cryotron circuits employing two alternate current paths, in which current is switched between the two paths in order to store and transmit information, it will be understood that persistent current cryogenic circuits may be employed in which the direction of the persistent current signifies and transmits the binary information, one direction of current flow signifying one state, and the other direction of current flow signifying the other state. Such persistent current circuits are shown for instance in a copending patent application Serial Number 30,019, filed on May 18, 1960, by M. K. Haynes and entitled "Memory System" and assigned to the same assignee as the present invention.

Figure 13:
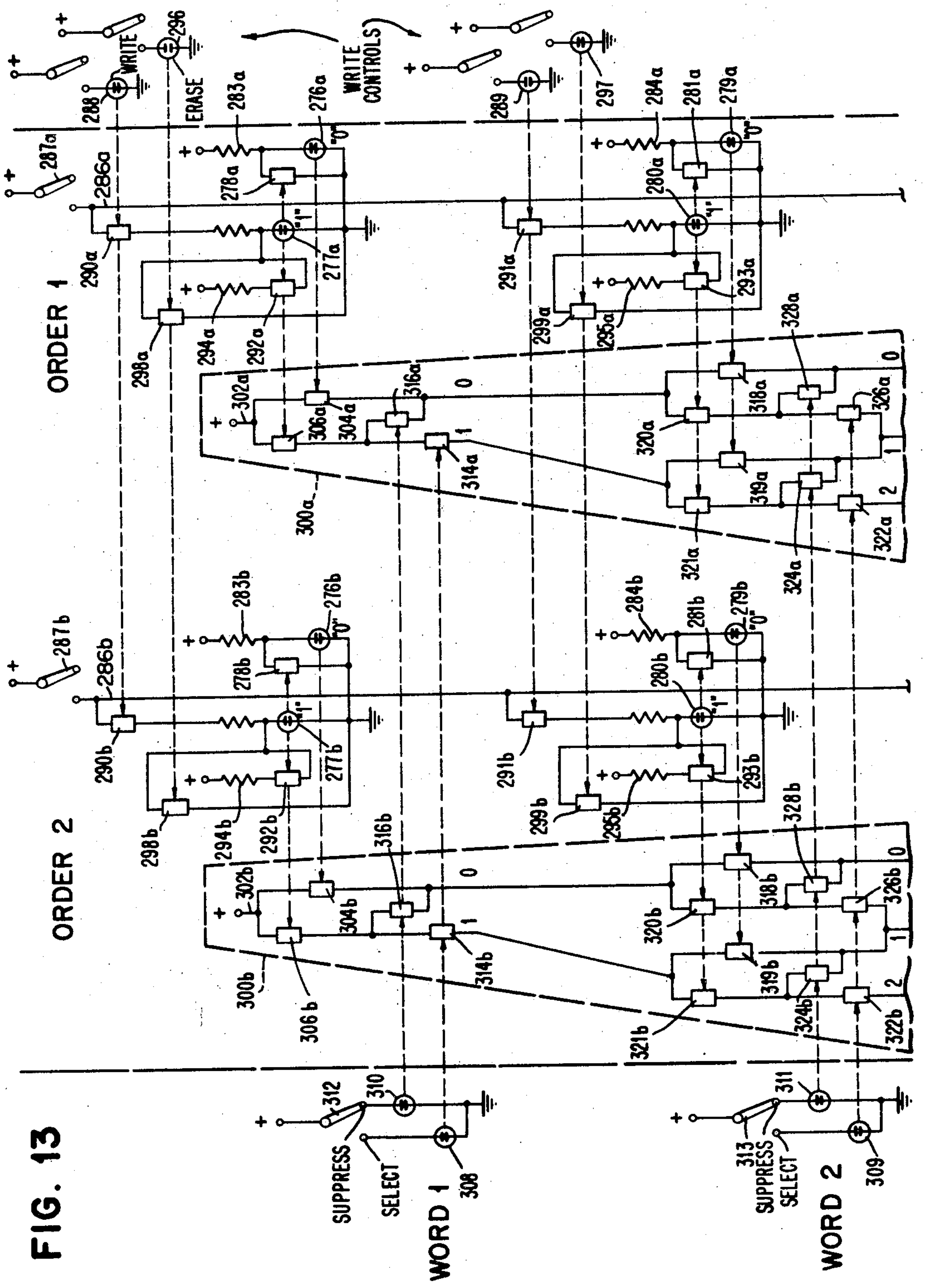
FIG. 13 is a schematic diagram illustrating a lamp-photoconductor embodiment of the present invention.

FIGURE 13 is a schematic diagram illustrating a lamp-photoconductor embodiment of the present invention. While all of the specific embodiments of the present invention described above have been carried out with cryogenic circuitry, the invention may also be implemented and carried out with other switching devices. For instance, FIGURE 13 shows lamp-photoconductor devices may be used for embodying a system in accordance with the present invention. Lamp-photoconductor combinations possess features which are common to cryogenic devices. Both may be referred to as "four terminal" devices because they each have two terminals for a control circuit and two terminals for a "gate" or a "controlled" circuit. In a cryogenic device, the control circuit consists of the control winding which crosses or encircles the cryotron. In the lamp-photoconductor combination, the control device terminals constitute the terminals of the lamp which creates the light which changes the impedance of the associated photoconductor. The photoconductor itself constitutes the gate which has two terminals.

Throughout FIGURE 13, small rectangular symbols such as indicated at 290*a* in the upper corner of the figure are employed to indicate photoconductor elements which have photoresponsive properties. Although the term "photoconductive" is used to describe such devices it should be emphasized that devices of this description as employed in the system of FIGURE 13 are really more accurately described as impedances which achieve a substantially reduced impedance value when they are illuminated. Thus it is contemplated that the impedance of one of these devices may be at least in the order of 200 megohms when not illuminated. But, when it is subjected to illumination, its resistance may drop to a typical value in the order of 50,000 ohms and very seldom will the illuminated impedance go below a value of 10,000 ohms. Thus, it is to be seen that a device having a minimum resistance of thousands of ohms, although commonly referred to as a photoconductor, should be more accurately described as an impedance having photoresponsive properties. However, the term "photoconductor" and the like is used in this specification, keeping these qualifications in mind. In the descriptions of this circuit, circuit paths will often be described as "completed" by the illumination of a particular photoconductor. It will be understood that this is not strictly correct because such a statement really means that a circuit path of lowered impedance is created by illumination of a photoconductor in a circuit which already exists.

Photoconductive devices having impedance characteristics as described above are commercially available. For instance, one such device may be purchased from the Clairex Corporation, of 50 West 26th Street, in New York city, under model number CL3A.

The typical impedance of the photoconductor as indicated above, at 50,000 ohms when illuminated, is applicable when the illumination is from a neon glow lamp positioned within reasonable proximity to the photoconductor. Small, inexpensive neon glow lamps which are suitable for this purpose are commonly available. A typical device of this kind is available for instance from the General Electric Company under Model No. NE-2. Such a device may require about 70 volts to initiate glow conduction when new, but after appreciable aging has occurred, the firing voltage may advance to the order of 115 volts. After the lamp has become illuminated, a negative resistance effect is to be observed such that the voltage across the glow lamp may drop to about 55 volts. As the lamp ages, this voltage also rises to a maximum value in the order of 100 volts. The current required for such a neon lamp may vary from one-quarter of a milliampere to one milliampere.

It will be appreciated that various other voltage responsive light source devices may be employed and that other photoresponsive devices may be used to detect the illumination from such devices. For instance, the voltage responsive light sources may be electroluminescent devices, or incandescent filament devices, or devices employing gaseous discharges to derive illumination from fluorescent coatings. In each instance, photoconductive devices are selected which are particularly responsive to the spectrum of light emitted by the light sources employed. Fortunately, the neon lamps mentioned above and the photoconductive devices mentioned above work well together. Accordingly, the neons are preferred and the light sources in the present specification are all indicated as being neon light sources, but it will be understood that other sources could be employed if desired.

One important advantage of the neon glow lamp as an electrical voltage responsive light source in the present system is the fact that it remains substantially completely dark until its firing voltage threshold is achieved, at which time it suddenly provides substantially full output illumination with a reduced voltage requirement. This characteristic is very desirable because it prevents false operation as long as the voltage is below the threshold value. It also provides for positive operation whenever the voltage goes above the threshold.

With neon glow lamps, it is generally necessary that some series impedance be employed, as well as some shunt impedance. The value of each of the shunt impedance is preferably about one megohm. This one megohm shunt across each neon serves to set a maximum impedance for the neon with respect to the remainder of the circuit. Although impedance values for the various circuit components are not specified, it will be understood that whenever operation is required to provide output illumination, the series impedances for the various neons will be so chosen as to result in a neon current in the order of one milliampere.

In order to simplify the drawing and to make it clearer and more easily understood, the lamp shunt and series impedances are omitted, but it will be understood that such impedances are to be employed in the practical embodiment of the invention. Each photoconductor is arranged for illumination from only one light source. All of the light paths are indicated by dotted lines terminated with arrows.

Also, to further simplify the drawings, the power supply connections are not wired in, either at the common ground connection or at the high voltage connections. The common ground connections are indicated conventionally by the ground symbol, and the high voltage connections are indicated by a terminal symbol with a + sign. The value of the supply voltage may be selected to conform to the impedance values and the current requirements of the circuit design. A good workable value of supply voltage has been found to be about 300 volts. When employing neon lamps as the light sources, it has been found desirable to employ a direct current power supply source, or an alternating current power supply at a frequency of about 1000 cycles. With other light sources, other voltages and frequencies may be employed. Conventional sources of power may be employed to obtain satisfactory operation of the systems of the present invention.

The lamp-photoconductor system of FIGURE 13 is only slightly different from the cryogenic embodiments and such differences as exist are required only because of differences in the nature of the lamp photoconductor combination. For instance, a signal on the control lamp circuit causes the associated photoconductor which is illuminated to be reduced in impedance. By contrast, a current in the control winding of the cryotron causes the cryotron gate to increase in impedance. However, within the limitations of this basic difference, it is quite practical to embody the present invention in a lamp-photoconductor system and such system bears a marked resemblance to the cryogenic embodiments.

FIGURE 13 illustrates only a part of a system, including only the first and second order columns at the first and second word levels. The individual character storage cells include a "zero" lamp and a "one" lamp, one or the other of which is lighted at all times during the operation of the system. In the first order of the first word level, the "zero" lamp is indicated at 276*a* and the "one" lamp at 277*a*. In the second word level, the "zero" lamp is indicated at 279*a* and the "one" lamp at 280*a*. The corresponding parts in the second order bear the same numbers, but with the suffix "*b*." If the one lamp 277*a* or 280*a* is lighted, then the photoconductors respectively indicated at 278*a* and 281*a* which are connected in shunt with the zero lamps 276*a* and 279*a* are illuminated to extinguish the zero lamps. Except when shunted out in this manner, the zero lamps 276*a* and 279*a* are continuously energized from the power connections indicated through the resistors respectively indicated at 283*a* and 284*a*. A write bus 286*a* is provided for the first order column, and whenever a one bit is to be written into any character storage position in the first order, a switch at the top of the write bus 286*a* schematically indicated at 287*a* is closed. This places power upon the write-in bus 286*a*. At each word level there is provided a write control lamp. These write lamps are represented at the right side of FIGURE 13, at 288 for the first word level, and at 289 for the second word level. At each individual character storage cell there is provided a write-in control photoconductor as indicated at 290*a* and 291*a*.

If the write control lamp 288 for the first word level is illuminated by the closure of its associated switch, then photoconductor 290*a* will be illuminated, as well as all of the other write control photoconductors for the first word level. If read-in bus switch 287*a* is closed to indicate a one bit in the first order, that signal will then pass through photoconductor 290*a* and energize lamp 277*a*. The illumination created by the "one" lamp 277*a* not only falls upon photoconductor 278*a* to extinguish the zero lamp 276*a* but it also illuminates a photoconductor 292*a* which provides an alternative source of power through the associated impedance 294*a* to latch and hold the lamp 277*a* in the illuminated position.

An erase lamp is also provided for each word level as indicated at 296 and 297 at the right margin of the drawing. Whenever an erase lamp such as 296 is illuminated by the closure of its associated switch, any "ones" which are stored in any order in the word level with which the particular erase lamp is associated are erased and all of the storage cells for that word are thus returned to zero. This is accomplished, for instance, in the first order at the first word level, by a photoconductor 298*a* which is electrically connected in shunt with the "one" lamp 277*a*. Photoconductor 298*a* is arranged to be illuminated by erase lamp 296, and when so illuminated, it shunts out the "one" lamp 277*a* by reducing the voltage acsoss that lamp below the maintenance voltage value. This releases the holding latch circuit including photoconductor 292*a* so that the "one" lamp 277*a* remains extinguished. With the extinguishment of "one" lamp 277*a*, the photoconductor 278*a* is darkened so that the shunt connection is removed on zero lamp 267*a* and the "zero" lamp is again illuminated.

In the first order in the second word level, the counterparts of the latching photoconductor 292*a*, the impedance 294*a*, and the erase photoconductor 298*a* are respectively shown at 293*a*, 295*a*, and 299*a*.

A counting network equivalent to the cryogenic counting network 56 is shown for the first order at 300*a*. Current is supplied as indicated at 302*a* and traverses either of the two photoconductors including a "zero" photoconductor 304*a* or a "one" photoconductor 306*a*. These last-mentioned photoconductors are respectively illuminated by either the "zero" storage cell lamp 276*a* or by the "one" storage cell lamp 277*a*.

At each word level, associated with the network 300*a* there is select-suppress apparatus which is capable of causing the suppression of any "one" counts at character storage positions within that word level so that they appear in the network as zeros. But, if the word is selected, all of the "ones" at that word level are counted in the network 300*a*. These select-suppress functions are supplied at the first word level by a select lamp 308 and a suppress lamp 310 and an associated switching device schematically illustrated at 312 at the left margin of the drawing. These lamps are respectively arranged to illuminate photoconductors 314*a* and 316*a* in the network 300*a*. It is to be seen that photoconductor 316*a* establishes a cross-connection between the "one" output line from photoconductor 306*a* to the "zero" output line from photoconductor 304*a*. Whenever the select-suppress apparatus is being operated in the suppress mode, with switch 312 in the right hand position as shown in the drawing, suppress lamp 310 is lighted. The resulting illumination of photoconductor 316*a* establishes a cross-connection for any "one" digit output indicated by a current through 306*a*, to connect that current over to the zero count line to make it appear as a zero within the network 300*a*. On the other hand, if the system is operated in the select mode, with the lamp 308 illuminated instead of lamp 310, then the cross-connection through photoconductor 316*a* is effectively eliminated, and the photoconductor 314*a* provides a circuit path to transmit the "one" count without change. "Zero" counts signified by currents through 304*a* are undisturbed by the select-suppress apparatus.

At the second word level, the structure of the network 300*a* is substantially similar to the structure at the first word level, except that the circuit is doubled to accommodate for the circumstance that the entering count at the word two level may be "zero" or "one," and the count after the second word level may be "zero," "one" or "two." Thus, counting photoconductors for the zero count, illuminated by lamp 279*a*, are indicated at 318*a* and 319*a*. Corresponding photoconductors for indicating a "one" count, illuminated by lamp 280*a* are indicated at 320*a* and 321*a*. The select-suppress lamps and the associated switch at the second word level are shown at 309, 311, and 313, and the associated select-suppress photoconductors in the network 300*a* are shown at 322*a*, 324*a*, 326*a* and 328*a*. If a "one" bit is counted at the first word level, the current proceeding from photoconductor 314*a* indicating such a "one" count will be supplied to the alternate circuits including photoconductors 319*a* and 321*a*. If word two is selected, and a "one" is stored at the second word level, than that "one" will be counted by the completion of a circuit through photoconductors 321*a* and 322*a* to provide the proper "two" count. However, if a "zero" is stored at the second word level, the circuit will be completed through photoconductor 219*a* to maintain the previous count of "one." Similarly, if word two is suppressed, a "one" count which causes the current to traverse photoconductor 321*a* will be cross-connected back to the "one" count line through the cross-connection photoconductor 324*a*. The operation is obviously similar if a "zero" is counted at the first word level, except that the switching takes place in the circuit branches including photoconductors 318*a* and 320*a*.

The structure and operation of the apparatus for the second order is identical to that of the first order so that it need not be separately described. However, corresponding parts in this second order are given the same numbers with the suffix "*c*" instead of "*a*" in order to make the correspondence of parts perfectly clear.

While the lamp-photoconductor embodiment of this invention as shown and described in connection with FIGURE 13 is obviously not nearly so complete as the cryogenic embodiments of the invention shown and described in connection with FIGURE 7, and other related figures, it is clear from the showing of FIGURE 13 how a lamp-photoconductor embodiment of the invention is carried out, particularly when considered with relation to existing knowledge of lamp-photoconductor switching circuits. For illustrations of such existing knowledge, for instance, attention is directed to copending United States patent application Serial Number 3,861, filed January 21, 1960, by P. R. Lowe and Rex Rice for "Photoresponsive Logical Circuits," and copending United States patent application Serial Number 38,646, filed June 24, 1960, by Rex Rice for a "Code Conversion and Display System" both of which applications are assigned to the same assignee as the present application. The last-mentioned of the above two applications is of particular interest with respect to lamp-photoconductor circuitry for converting information represented in a first code to a representation of that information in a second code.

It is apparent that various "connections" which were accomplished in the cryogenic embodiments by the use of electrical conductors are accomplished in this lamp-photoconductor embodiment by beams of light. Thus, the "connnections" from the character storage cell in the first order of the first word to the counting network 300*a* are accomplished by beams of light respectively from "zero" lamp 276*a* to photoconductor 304*a* or from "one" lamp 277*a* to photoconductor 306*a*. In like manner, the "connections" from the write and erase lamps 288 and 296, and from the select-suppress lamps 308 and 310 are optical in nature.

A detailed comparison of systems will show that the storage cell and read-out structures of FIGURE 13 are combined in a manner analogous to the cryogenic system modification shown in FIGURE 11. Also, the method of select-supress control is analagous to the cryogenic system modification of FIGURE 12.

While the calculating memory systems of this invention are primarily arithmetic in nature, it will be appreciated that the combinations which the memory is capable of deriving may be regarded broadly as logical combinations of characters, or bit patterns, rather than numerical sums or products of numbers.

While the invention has been particularly shown and described with reference to preferred embodiments thereof, it will be understood by those skilled in the art that various changes in form and details may be made therein without departing from the spirit and scope of the invention.

What is claimed is:

1. A binary calculating memory system comprising binary digit storage cells arranged in rows to store numerical words and with corresponding cells arranged in columns corresponding to digital orders, means including a select-suppress unit for each storage cell for selectively reading out each digit of a selected group of digits, a separate adding circuit for each digital order connected to receive a read-out from all of said select-suppress units for that order, said select-suppress units being operative when in the select mode to supply either a zero or a one read-out to the associated adding circuit according to the information stored in the associated cell for each digit within said selected digit group, and said select-suppress units being operative when in the suppress mode to supply a zero bit to the associated adding circuit for each digit not included within said selected digit group, each adding circuit including carry output circuits connected to read carry signals to higher order adding circuits, separate column adding circuits for receiving carries above the highest order of digit storage, and a sum register connected to all of said adding circuits, said adding circuits each being operative to add all digits read thereto from said select-suppress units and all carries from lower digit orders to generate a digit sum for storage in said sum register and to generate carries for summation in said higher order adding circuits.

2. A system as set forth in claim 1 in which said selected digit group is formed from members of at least one subgroup, each said subgroup consisting of digits stored in a single row.

3. A system as set forth claim 1 in which said selected digit group is formed from members of at least one subgroup, each said subgroup consisting of digits stored in a single column.

4. A binary calculating memory system comprising binary digit storage cells arranged in rows to store numerical words and with corresponding cells arranged in columns corresponding to digital orders, means including a select-suppress unit for each storage cell for selectively reading out each digit of a selected group of digits, a separate adding circuit for each digital order connected to receive a read-out from all of said select-suppress units for that order, said select-supress units being operative when in the select mode to supply either a zero or a one read-out to the associated adding circuit according to the information stored in the associated cell for each digit within said selected digit group, and said select-suppress units being operative when in the suppress mode to supply a zero bit to the associated adding circuit for each digit not included within said selected digit group, each adding circuit comprising a plurality of vertically alternately arranged counting networks and decode networks, said counting networks being connected and arranged to receive signals from all of said select-suppress units and carry signals from any lower digital orders, each of said counting networks being operative to generate a count of all of said input signal values fed thereto, said count being expressed in terms of a unique signal on one out of a plurality of output connections, a separate decode network connected to said output connections for each of said counting networks, each of said decode networks being operable to generate a sum bit and at least one carry bit, the carry bit being supplied through suitable connections to a higher order counting network, the sum bit from all but the final decode network being supplied through suitable connections to the next succeeding counting network, and a sum register connected to the final decode network of each of said adding circuits for storage of the final sum value for the associated order column.

5. A calculating memory system comprising binary digit storage cells arranged in rows to store numerical words and with corresponding cells arranged in columns corresponding to digital orders, selective writing means including write bus circuits for each column, said writing means being operable to simultaneously write a new word into the digit storage cells of each of a selected group of rows, said selected group of rows comprising at least one row, means associated with each storage cell for reading out of each digit, a separate adding circuit for each digital order connected to receive a read-out from all of said read-out means for that order, a separator select-suppress means associated with each digit storage cell and operative when in a select mode to cause either a zero or a one to be counted in the associated adding circuit according to the information stored in the associated cell for each digit within a selected digit group, and said select-suppress means being operative when in a suppress mode to cause a zero to be counted in the associated adding circuit for each digit not included within said selected digit group, each adding circuit including carry output circuits connected to read carry signals to higher order adding circuits, separate column adding circuits for reeciving carries above the highest order of digit storage, and a sum register connected to all of said adding circuits, said adding circuits each being operative to sum all digits of said selected group read thereto and all carries read thereto from lower digital orders to generate a digit sum for storage in said sum register and to generate carries for summation in said higher order adding circuits.

6. A cryogenic calculating memory system including binary digit storage cells comprised of cryogenic current storage loops arranged in rows to store numerical words and with corresponding cells arranged in columns corresponding to digital orders, means including a cryogenic select-suppress unit associated with each storage cell for selectively reading out each digit of a selected group of digits, a cryogenic adding circuit for each digital order connected to receive a read-out from all of said read-out means for that order, each of said read-out means being operative when the associated select-suppress unit is in the select mode to cause the registration of either a zero or a one in the associated adding circuit according to the information stored in the associated cell for each digit within said selected digit group, and each said read-out means being operative when the associated select-suppress unit is in the suppress mode to cause the registration of only a zero bit in the associated adding circuit for each digit not included within said selected digit group, each adding circuit comprising a plurality of vertically alternately arranged cryogenic counting networks and decode networks, said counting networks being connected and arranged to receive signals from all of said read-out means and carry signals from any lower digital orders, each of said counting networks being operative to generate a count of all of said input signal values fed thereto, said count being expressed in terms of a current on one out of a plurality of output connections, a separate cryotron decode network connected to said output connections for each of said counting networks, each of said decode networks being operable to generate a sum bit and at least one carry bit, the carry bit being supplied through suitable connections to a higher order counting network, the sum bit from all but the final decode network being supplied through suitable connections to the next succeeding adding circuit and a cryogenic current storage loop sum register connected to the final decode network of each of said adding circuits for storage of the final sum value for the associated order column.

7. A calculating memory system alternatively operable for addition or multiplication comprising binary digit storage cells arranged in rows to store numerical words and with corresponding cells arranged in columns corresponding to digital orders, selective writing means including separate write bus circuits for each digit of a word to be written into memory, said writing means being operable to simultaneously write a new word into the digit storage cells of each row of a selected group of rows, said selected group of rows comprising at least one row, add-multiply circuits connected to control said write bus circuits and operable when in the add mode to cause said word to be written into said selected group of rows in an unshifted position, and said add-multiply circuits being operable when in the multiply mode to control said write bus circuits to cause the writing of said word in successively left-shifted positions in each successive row of said selected group of rows after the first, each row of said selected group of rows corresponding to a possible multiplier digit when said system is operated in the multiplication mode, the first row having no shift corresponding to the lowest order multiplier digit and the last row having the greatest shift corresponding to the highest order multiplier digit, means associated with each storage cell for reading out each digit, a separate adding circuit for each digital order connected to receive a read-out from all of said read-out means for that order, a separate select-suppress means associated with each digit storage cell and operative when in a select mode to cause either a zero or a one to be counted in the associated adding circuit according to the information stored in the associated cell for each digit within a selected digit group, and said select-suppress means being operative when in a suppress mode to cause a zero to be counted in the associated adding circuit for each digit not included within said selected digit group, said selected digit group comprising the digits stored in at least one row when said system is operated in the addition mode, and said selected digit group comprising the digits stored in each row of said selected group of rows written into for which there is a multiplier one bit when said system is operated in the multiplication mode, each adding circuit including carry output circuits connected to read carry signals to higher order adding circuits, separate column adding circuits for receiving carries above the highest order of digit storage, and a sum register connected to all of said adding circuits, said adding circuits each being operative to sum all digits of said selected group read thereto and all carries read thereto from lower digital orders to generate a digit sum for storage in said sum register and to generate carries for summation in said higher order adding circuits.

8. A system as set forth in claim 7 which is embodied in circuits employing four terminal variable impedance devices.

9. A system as set forth in claim 8 in which said four terminal variable impedance devices are cryotrons.

10. A system as set forth in claim 8 in which said four terminal variable impedance devices are lamp-photoconductor combinations.

11. A calculating memory system operable for rapid multiplication by selective summing of partial products comprising binary digit storage cells arranged in rows to store numerical words and with corresponding cells arranged in columns corresponding to digital orders, writing means including separate write bus circuits for each digit of a multiplicand to be written into memory, said writing means being operable to simultaneously write said multiplicand into the digit storage cells of each row of a selected group of rows comprised of the members of a group of successive rows, each row of said group of successive rows corresponding to a possible multiplier digit, the multiplicand being written into the first row corresponding to the lowest order multiplier digit with no shift and in each successive additional row corresponding to each successively higher order multiplier digit with a one order successive left shift, means associated with each storage cell for reading out each digit, a separate adding circuit for each digital order connected to receive a read-out from all of said read-out means for that order, a separate select-suppress means associated with each digit storage cell and operative when in a select mode to cause either a zero or a one to be counted in the associated adding circuit according to the information stored in the associated cell for each digit within a selected digit group, and said select-suppress means being operative when in a suppress mode to cause a zero to be counted in the associated adding circuit for each digit not included within said selected digit group, said selected digit group comprising the digits stored in each row of said group of successive rows, one of said selected groups being limited to rows corresponding to multiplier digit orders for which there is a multiplier one bit, each adding circuit including carry output circuits connected to read carry signals to higher order adding circuits, separate column adding circuits for receiving carries above the highest order of digit storage, and a sum register connected to all of said adding circuits said adding circuits each being operative to sum all digits of said selected group read thereto and all carries read thereto from lower digital orders to generate a digit sum for storage in said sum register and to generate carries for summation in said higher order adding circuits.

12. A system as set forth in claim 11 in which said selected group which is limited to rows corresponding to multiplier digit orders for which there is a multiplier one bit is the selected group of rows written into.

13. A system as set forth in claim 11 in which said selected group which is limited to rows corresponding to multiplier digit orders for which there is a multiplier one bit is the digit group selected by said select-suppress means.

14. A cryogenic calculating memory system alternatively operable for addition or multiplication comprising binary digit storage cells comprised of cryogenic storage loops arranged in rows to store numerical words and with corresponding cells arranged in columns corresponding to digital orders, selective writing means including separate cryogenic write bus circuits for each digit of a word to be written into memory, said writing means being operable to simultaneously write a new word into the digit storage cells of each row of a selected group of rows by switching the appropriate cryotron gates, said selected group of rows comprising at least one row, add-multiply circuits including cryotron control windings connected to control cryotron gates in said write bus circuits and operable when in the add mode to cause said word to be written into said selected group of rows in an unshifted position, and said add-multiply circuits being operable when in the multiply mode to control said write bus circuits to cause the writing of said word in successively left-shifted positions in each successive row of said selected group of rows after the first, each row of said selected group of rows corresponding to a possible multiplier digit when said system is operated in the multiplication mode, the first row having no shift corresponding to the lowest order multiplier digit and the last row having the greatest shift corresponding to the highest order multiplier digit, means including a cryogenic select-suppress unit associated with each storage cell for selectively reading out each digit of a selected group of digits, a cryogenic adding circuit for each digital order connected to receive a read-out from all of said read-out means for that order, each of said read-out means being operative when the associated select-suppress unit is in the select mode to cause the registration of either a zero or a one in the associated adding circuit according to the information stored in the associated cell for each digit within said selected digit group, and each said read-out means being operative when the associated select-suppress unit is in the suppress mode to cause the registration of only a zero bit in the associated adding circuit for each digit not included within said selected digit group, said selected digit group comprising the digits stored in at least one row when said system is operated in the addition mode, and said selected digit group comprising the digits stored in each row of said selected group of rows written into for which there is a multiplier one bit when said system is operated in the multiplication mode, each adding circuit comprising a plurality of vertically alternately arranged cryogenic counting networks and decode networks, said counting networks being connected and arranged to receive signals from all of said read-out means and carry signals from any lower digital orders, each of said counting networks being operative to generate a count of all of said input signal values fed thereto, said count being expressed in terms of a current on one out of a plurality of output connections, a separate cryotron decode network connected to said output connections for each of said counting networks, each of said decode networks being operable to generate a sum bit and at least one carry bit, the carry bit being supplied through suitable connections to a higher order counting network, the sum bit from all but the final decode network being supplied through suitable connections to the next succeeding adding circuit, and a cryogenic current storage loop sum register connected to the final decode network of each of said adding circuits for the storage of the final sum value for the associated order column.

References Cited in the file of this patent

UNITED STATES PATENTS

| | | |
|---|---|---|
| 2,318,591 | Couffignal | May 11, 1943 |
| 2,832,897 | Buck | Apr. 29, 1958 |
| 2,923,475 | Ketchledge | Feb. 2, 1960 |

OTHER REFERENCES

Marshall, T. G., Jr., and Andrews, L. J.: "Research on Electro-Optical and Magnetic Core Logic" (ASTIA Document No. AD 142017, September 1957), pp. 7 to 26.